United States Patent
Kuwahara et al.

(10) Patent No.: US 6,389,288 B1
(45) Date of Patent: *May 14, 2002

(54) MOBILE COMMUNICATION TERMINAL CAPABLE OF EXECUTING LOCATION-RELATED SERVICES

(75) Inventors: Soichi Kuwahara; Keiki Nishihara, both of Fukuoka (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,548

(22) Filed: Mar. 27, 1998

(30) Foreign Application Priority Data

Jun. 27, 1997 (JP) ............................... 9-172193

(51) Int. Cl.[7] ................................. H04Q 7/20
(52) U.S. Cl. ....................... 455/456; 455/414; 340/994; 340/825.36; 340/825.49; 379/211.02; 372/107; 372/357.01; 372/450; 701/23; 701/211
(58) Field of Search ................................ 455/456, 457, 455/427, 429, 440, 524; 340/994, 995, 825.36, 825.49; 379/211, 912; 342/357, 107–109, 450–465; 701/23, 200–221

(56) References Cited

U.S. PATENT DOCUMENTS

| | | | | |
|---|---|---|---|---|
| 5,208,756 A | * | 5/1993 | Song | 455/456 |
| 5,442,805 A | * | 8/1995 | Sagers et al. | 455/456 |
| 5,467,388 A | * | 11/1995 | Redd, Jr. et al. | 379/196 |
| 5,470,233 A | * | 11/1995 | Fruchterman et al. | 434/112 |
| 5,479,476 A | * | 12/1995 | Finke-Anlauff | 455/550 |
| 5,588,048 A | * | 12/1996 | Neville | 379/127 |
| 5,594,947 A | * | 1/1997 | Grube et al. | 455/509 |
| 5,802,492 A | * | 9/1998 | DeLorme et al. | 701/200 |
| 5,857,155 A | * | 1/1999 | Hill et al. | 455/456 |
| 5,901,358 A | * | 5/1999 | Petty et al. | 455/456 |
| 5,926,133 A | * | 7/1999 | Green, Jr. et al. | 342/363 |
| 5,930,713 A | * | 7/1999 | Nguyen | 455/440 |
| 5,945,949 A | * | 8/1999 | Yun | 342/457 |
| 5,955,973 A | * | 9/1999 | Anderson | 340/988 |
| 6,009,333 A | * | 12/1999 | Chaco | 455/456 |

FOREIGN PATENT DOCUMENTS

| | | |
|---|---|---|
| JP | 6-69861 | 3/1994 |
| JP | 07-030959 | 1/1995 |
| JP | 07-147696 | 6/1995 |
| JP | 7-231481 | 8/1995 |
| JP | 7-240966 | 9/1995 |
| JP | 8-79829 | 3/1996 |

\* cited by examiner

Primary Examiner—Dwayne Bost
(74) Attorney, Agent, or Firm—Rosenman & Colin LLP

(57) ABSTRACT

A mobile communication terminal includes: a reported location information detecting unit for detecting reported location information from a base station; a reported location information managing unit for managing one of the reported location information specified by a user and a variation of the reported location information specified by the user; a registered process executing unit for executing, when it is determined that the reported location information detected by the reported location information detecting unit matches the reported location information managed by the reported location information managing unit, a predetermined process that corresponds to the reported location information producing the match.

17 Claims, 28 Drawing Sheets

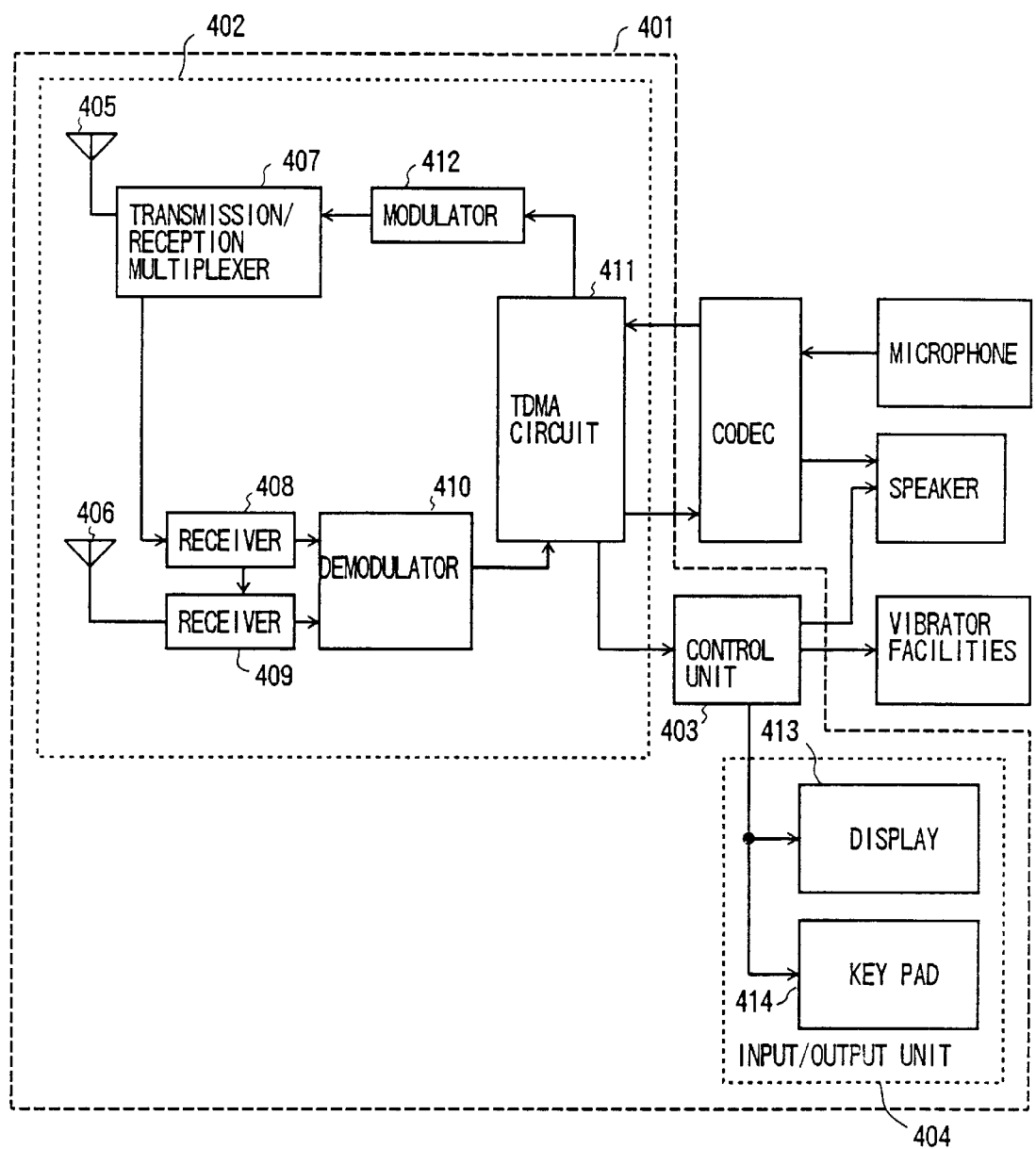
F I G. 4

FIG. 7

| CALL ORIGINATING NUMBER | CALL ORIGINATOR ATTRIBUTE | COMMENT |
|---|---|---|
| 092-111-2222 | PRIVATE | FRIEND A |
| 044-999-1111 | WORK | PEER B |
| 050-7771111 | WORK | BOSS C |
| 030-2222222 | PRIVATE | FRIEND B |

FIG. 8

```
PROCESS IN PRIVATE MODE
  if (CALL ORIGINATOR ATTRIBUTE=PRIVATE)
      CALL INCOMING
  if (CALL ORIGINATOR ATTRIBUTE=WORK)
      GUIDANCE 1
      ANSWER PHONE
  else
      GUIDANCE 2
      CALL INCOMING PROCESS IN WORK MODE
  if (CALL ORIGINATOR ATTRIBUTE=PRIVATE)
      GUIDANCE 3
  if (CALL ORIGINATOR ATTRIBUTE=WORK)
      CALL INCOMING
  else
      GUIDANCE 4
      ANSWER PHONE
```

FIG. 12

| REGISTERED REPORTED LOCATION INFORMATION | USER-DEFINED AREA NAME |
|---|---|
| Zone B 4 | HOME |
| Zone C 2 | OFFICE |
| Zone C 5 | MEETING ROOM |
| Zone B 10 | LIBRARY |

FIG. 13

| USER-DEFINED AREA NAME | REPORTED LOCATION INFORMATION | EXECUTION SERVICE |
|---|---|---|
| HOME | ZoneB4 | SETTING OF CALL INCOMING ALERT METHOD :SOUND (AREA-ONLY MODE) |
| | | SETTING OF SCREENING:PRIVATE (TRIGGERRED EXECUTION MODE) |
| OFFICE | ZoneC2 | SETTING OF CALL INCOMING ALERT METHOD :SOUND (TRIGGERRED EXECUTION MODE) |
| | | SETTING OF SCREENING:WORK (TRIGGERRED EXECUTION MODE) |
| MEETING ROOM | ZoneC5 | SETTING OF CALL INCOMING ALERT METHOD :VIBRATOR (AREA-ONLY MODE) |
| | | SETTING OF SCREENING:WORK (TRIGGERRED EXECUTION MODE) |
| LIBRARY | ZoneB10 | SETTING OF CALL INCOMING ALERT METHOD :VIBRATOR (AREA-ONLY MODE) |

| REPORTED LOCATION INFORMATION | USER-DEFINED AREA NAME |
|---|---|
| (Zone1) and (Zone2) and (Zone3) | HOME |

| REPORTED LOCATION INFORMATION | USER-DEFINED AREA NAME |
|---|---|
| (Zone A1) and (Zone B1) | HOME |

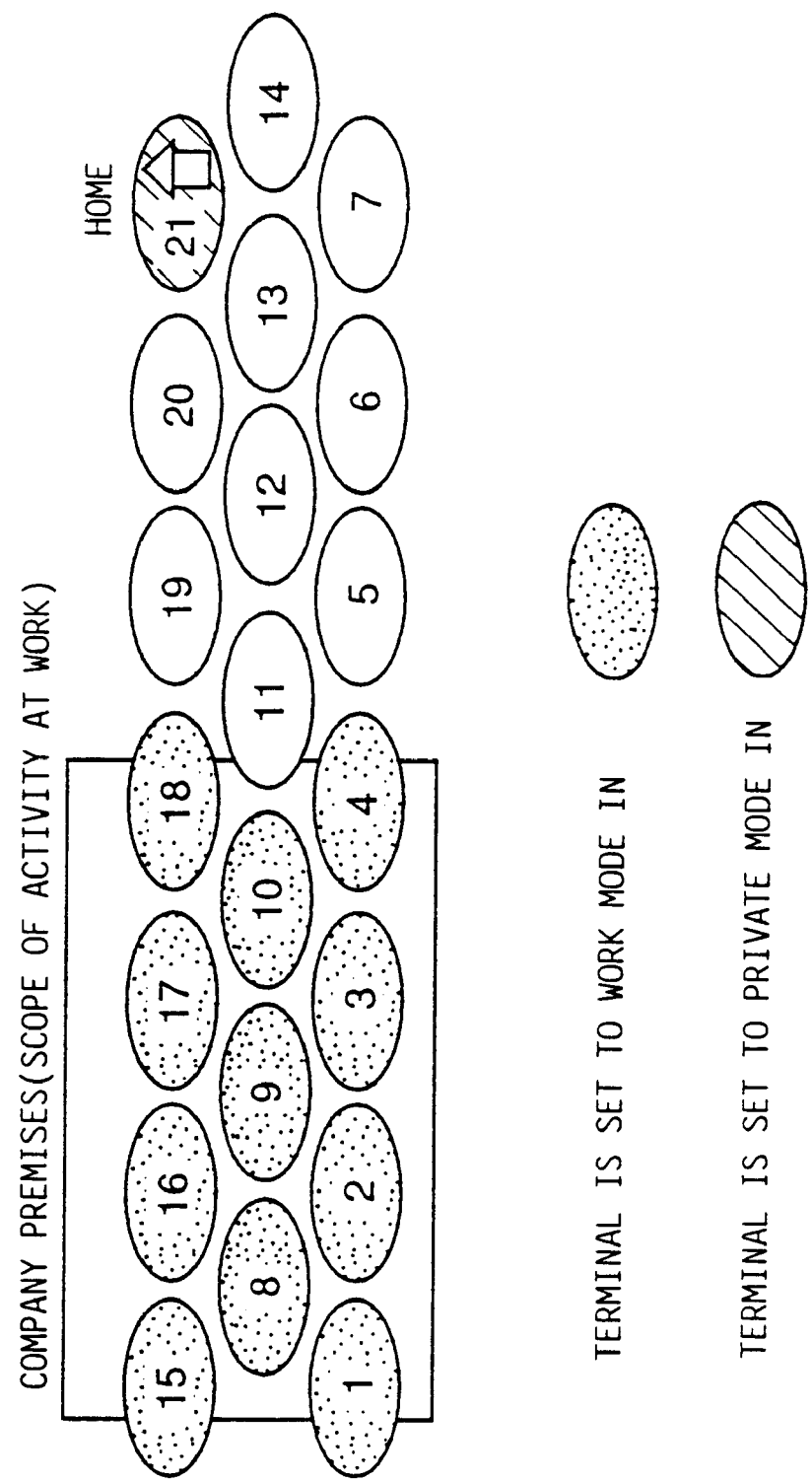

FIG. 18

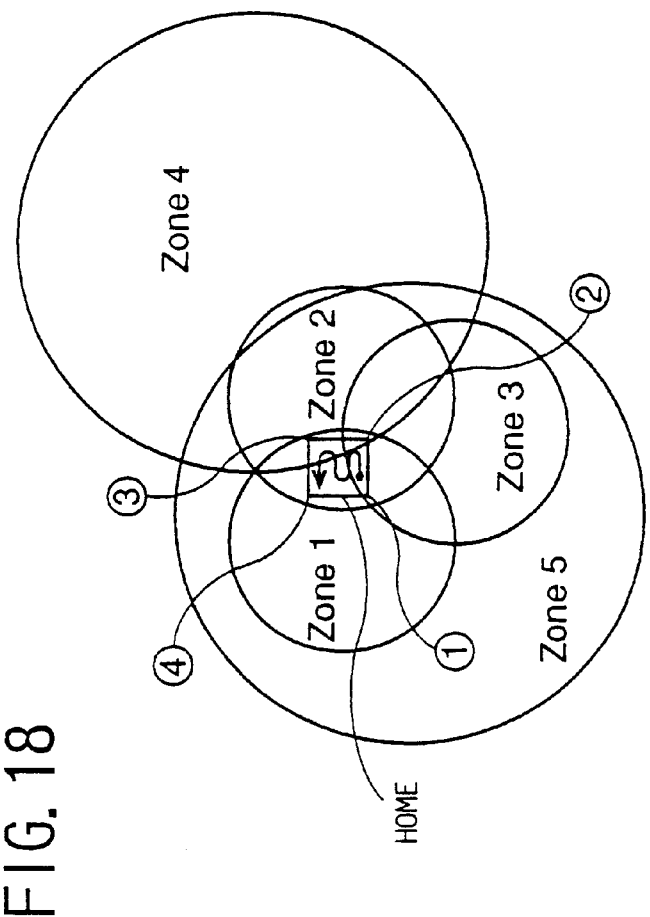

☐ : SPACE RECOGNIZED BY USER(FOR EXAMPLE, "HOME")

① : SPACE IN ☐ INDICATED BY (Zone 1)and(Zone 2)and(Zone 3)and($\overline{\text{Zone 4}}$)and(Zone 5)

② : SPACE IN ☐ INDICATED BY (Zone 1)and(Zone 2)and(Zone 3)and($\overline{\text{Zone 4}}$)and(Zone 5)

③ : SPACE IN ☐ INDICATED BY (Zone 1)and(Zone 2)and($\overline{\text{Zone 3}}$)and($\overline{\text{Zone 4}}$)and(Zone 5)

④ : SPACE IN ☐ INDICATED BY (Zone 1)and(Zone 2)and($\overline{\text{Zone 3}}$)and($\overline{\text{Zone 4}}$)and(Zone 5)

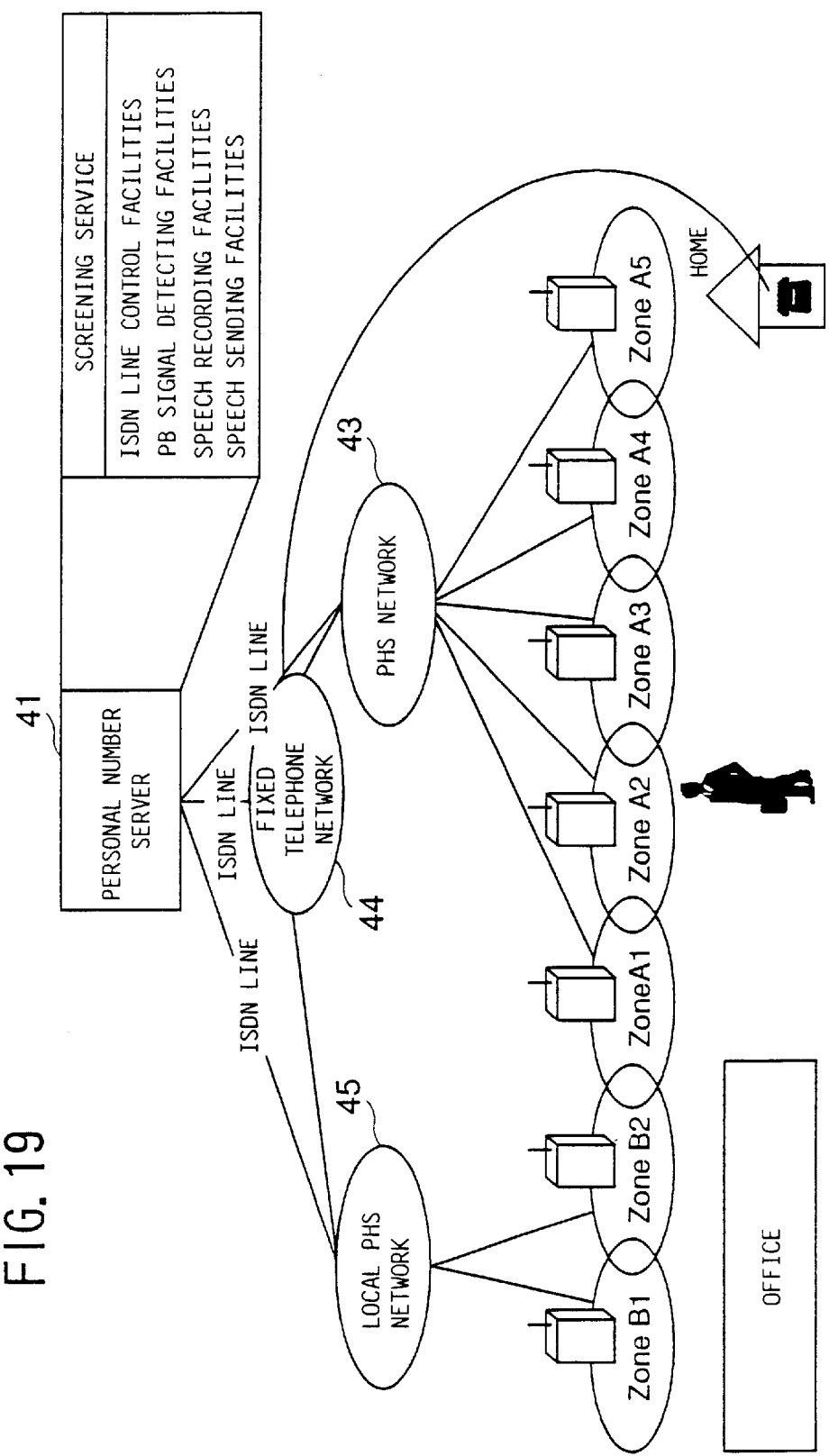

FIG. 21

| USER-DEFINED AREA VECTOR NAME | DESIGNATED VARIATION OF REPORTED LOCATION INFORMATION | EXECUTION SERVICE |
|---|---|---|
| OFFICE(IN) | ZoneA6→ZoneB7 | SETTING OF SCREENING:WORK<br><br>[PERSONAL SERVICE NUMBER + PERSONAL NUMBER + SCREENING SERVICE MODE SETTING NUMBER + MODE NUMBER(WORK) DIAL] |
| OFFICE(OUT) | ZoneB7→ZoneA6 | SETTING OF SCREENING:PRIVATE MODE<br><br>[PERSONAL SERVICE NUMBER + PERSONAL NUMBER + SCREENING SERVICE MODE SETTING NUMBER + MODE NUMBER(PRIVATE) DIAL] |
| MEETING ROOM(IN) | ZoneB2→ZoneB1 | CALL INCOMING ALERT MODE:VIBRATOR |
| MEETING ROOM(OUT) | ZoneB1→ZoneB2 | CALL INCOMING ALERT MODE:SOUND |
| OUTSIDE | ZoneA14→ZoneA11 | ANSWER PHONE FACILITIES:SET<br>SETTING OF SCREENING:PRIVATE |
| HOME | ZoneA11→ZoneA14 | ANSWER PHONE FACILITIES:CANCELED<br>SETTING OF CALL DESTINATION TERMINAL:HOME TELEPHONE SET |

FIG. 22

| USER-DEFINED AREA VECTOR NAME | FIRST REPORTED LOCATION INFORMATION | SECOND REPORTED LOCATION INFORMATION | EXECUTION SERVICE |
|---|---|---|---|
| HOME | (ZoneA11) and (ZoneA15) | (ZoneA14) and (ZoneB20) | CANCEL ANSWER PHONE SERVICE<br><br>SET HOME TELEPHONE SET AS CALL DESTINATION TERMINAL |

MOBILE COMMUNICATION TERMINAL CAPABLE OF EXECUTING LOCATION-RELATED SERVICES

BACKGROUND OF THE INVENTION

1. Field of the Invention

The present invention generally relates to mobile communication terminals and, more particularly, to a mobile communication terminal such as a portable telephone set or a PHS terminal, capable of automatically or semi-automatically executing a communication service in a mobile communication system according to the location and the condition.

Execution of communication services that a mobile common carrier offers corresponds closely to a location and a condition in which a mobile communication terminal is used. For example, a user may not want a business-related call to arrive in a private time. Conversely, the user may not want a private call to arrive during work. Further, the user may usually want a call to arrive with a ringing tone, but may also want a call to arrive with a vibrator alarm or in an answer phone mode while the user is in a meeting room or a library. However, when such a setting is executed manually, a call which otherwise should arrive may not arrive, or a call may arrive with a ringing tone while the user is in a meeting room or a library, due to an error in the operation or a failure to provide the appropriate setting.

Recently, the area covered by one base station has become small as in a PHS system, so that it has become possible to automatically or semi-automatically offer communication service that depends on a place and condition in which a user is in, to a mobile communication terminal.

2. Description of the Related Art

A car navigation system is well known as a mobile communication system in which a mobile common carrier offers communication service to a mobile user, based on location information. A car navigation system provides communication service such that the current location information of a mobile user is detected, and the current location information is transmitted to a mobile common carrier. The mobile common carrier retrieves map information and transmits the map information to the mobile user.

A similar system is known wherein a mobile communication terminal detects reported location information reported by a base station, the mobile communication terminal supplies the reported location information to a mobile communication network so that the mobile common carrier provides communication service accordingly.

Such systems not only provide map information but also information and communication service relating to the location of the mobile communication terminal. For example, information relating to local facilities and service programs may be provided. The mobile communication terminal can request expansion or update of the information in a database provided by the mobile common carrier. With this, the mobile common carrier can provide the latest information that meets the demands of the users. The mobile common carrier maintains a database on its own in order to manage the reported location information and the communication services to be executed.

In a mobile common carrier in which the area indicated by the reported location information from a mobile communication terminal is identified so that a setting of a mobile communication terminal is changed automatically, the following problems exist.

Because the reported location information is introduced in order to facilitate management of a location of a terminal in a mobile communication network by a mobile common carrier, it has nothing to do with community. Accordingly, a location managing host, a manager in a mobile communication system, should generate a database of map information that relates the community to the area indicated by position information of the terminal managed by the mobile communication network. However, there is a problem in that much storage capacity is needed if the position information from different mobile common carriers is introduced in the map information and if the communication service preset individually by users is managed by a switch.

It is difficult for a switch to centrally determine a communication service because the significance of an area indicated by the reported location information submitted by a mobile communication terminal is different from one individual to another and should be preset by an individuals own initiative.

As the area indicated by the reported location information becomes smaller, the volume of reported location information that a mobile communication terminal detects increases. As a result, the frequency with which the mobile communication terminal reports the reported location information to the mobile communication network increases, so that the traffic of the location information supplied from the mobile communication network to the location managing host increases.

The mobile communication network of a mobile communication system usually manages information related to an area in the form of several sets of reported location information put together, instead of the reported location information itself, in order to prevent an increase in the traffic of the reported location information from mobile communication terminals. Therefore, it is not possible for the managing host to perform detailed location management if the location information managed by a mobile communication network is used. Accordingly, the map information that relates the location indicated by the location information to the community cannot be properly generated.

Assuming a case in which the location managing host receives location information via a switch, and assuming that the mobile communication networks of several mobile common carriers are to be used, each communication network needs to have facilities to transmit location information to the location managing host, which is difficult to implement.

SUMMARY OF THE INVENTION

Accordingly, a general object of the present invention is to provide a mobile communication terminal in which the aforementioned problems are eliminated.

Another and more specific object of the present invention is to automatically execute communication service whereby an area indicated by the reported location information is identified so that the setting of a mobile communication terminal is automatically changed.

The aforementioned objects can be achieved by a mobile communication terminal comprising: reported location information detecting means for detecting reported location information from a base station; reported location information managing means for managing one of the reported location information specified by a user and a variation of the reported location information specified by the user; registered process executing means for executing, when it is determined that the reported location information detected by the reported location information detecting means matches the reported location information managed by the reported location information managing means, a predetermined process that corresponds to the reported location information producing the match.

According to the mobile communication terminal of the present invention, it is possible to manage specific reported location information or a variation of reported location information designated by the reported location information managing means. Accordingly, a location managing host does not need to generate a database that relate the community to the area indicated by the location information of the terminal managed by the mobile communication network. Accordingly, as compared to the mobile communication system in which a communication service set by an individual is managed by a switch, the system in which the mobile communication terminal of the present invention is introduced reduces the required storage capacity of the switch to a significant degree.

Since the mobile communication terminal according to the invention is capable of managing specific reported location information and a variation of reported location information designated by the reported location managing means, it is possible for an individual to set a communication service on its own initiative even when the significance of an area indicated by the reported location information reported by the mobile communication network differs from one individual to another.

Even when the volume of reported location information detected by the mobile communication terminal increases as the area indicated by the reported location information decreases, the mobile communication terminal according to the invention makes it possible to reduce the volume of traffic of the location information supplied from the mobile communication network to the location managing host, by managing specific reported location information and a variation in reported location information designated by the reported location information managing means.

The mobile communication network of a mobile communication system usually manages information related to an area in the form of several sets of reported location information put together, instead of the reported location information itself, in order to prevent an increase in the traffic of the reported location information from mobile communication terminals. By managing reported location information and a variation of reported location information designated by the reported location information managing means, it is easy for the mobile communication terminal to generate map information that relates an area indicated by the reported location information to the community.

By managing reported location information and a variation of reported location information designated by the reported location information managing means, the communication network need not be provided with facilities to transmit the reported location information to a location managing host even when the mobile communication terminal uses a plurality of communication networks.

In order to achieve the aforementioned objects, the mobile communication terminal may further comprise current reported location information storage means for storing current reported location information; user-defined area name registering means for defining an arbitrary user-defined area name with respect to the current reported location information stored in the current reported location information storage means, by operating the mobile communication terminal; and execution service registering means for registering a process to be executed when the reported location information that corresponds to the user-defined area name is received, by operating the execution service registering means; and wherein the reported location information managing means comprises: storage means for storing the reported location information, the user-defined area name and the execution service, in relation to each other.

Displaying the unprocessed reported location information in the form of "zone1" or "zone2" would not allow a user to readily recognize an associated area. However, the above-described construction makes it possible for the user-defined area registering means to assign user-defined area names such as "meeting room" and "home" to "zone1" and "zone2", respectively. Further, by storing the reported location information, the user-defined area name and the execution in relation to each other in the storage means, the subsequent search becomes easy.

The execution service registering means may comprise selecting means for selecting one of a triggered execution mode and an area-only mode for each execution service executed to set a condition (parameter) for a communication service and executed upon receipt of the reported location information that corresponds to the user-defined area name defined with respect thereto, the triggered execution mode being a mode wherein the selection by the selecting means is triggered by the reception of the reported location information that corresponds to the user-defined area name defined with respect thereto, and is maintained even after the mobile communication terminal leaves an area that corresponds to the user-defined area name, and the area-only mode being a mode wherein a previous setting for executing a previous executed execution service is stored in the storage means, and the execution service corresponding to the user-defined area name is selected, the previous setting being restored when the mobile communication terminal leaves the area that corresponds to the user-defined area name.

According to this aspect of the present invention, the user of the mobile communication terminal can select the area-only mode when an execution service is to be set only in the target area such as a meeting room. When it is required that an execution service is to be executed while the user is in an office, the user may assign a user-defined area name to, for example, an entrance of the office and select the triggered execution mode, because, if the office is relatively large in area, setting of a user-defined area name in the area-only mode would be relatively time-consuming.

The mobile communication terminal may further comprise a timer unit for measuring a time that elapsed from a detection of the reported location information constituting the designated variation of the reported location information that corresponds to the user-defined area vector name, to a detection of the reported location information also constituting the designated variation, and for notifying the user-defined area vector name detecting means that a time-out has occurred when a count of the timer exceeds a predetermined period of time preset by a user of the mobile communication terminal.

With such a construction, the user-defined area vector detecting means can detect a designated variation of reported location information if the time that elapsed from a detection of the first reported location information to a detection of the subsequent reported location information is within the period of time preset in the timer.

The registered process executing means may comprise call incoming alert mode selecting means for selecting a call incoming alert mode.

With this construction, the user of the mobile communication terminal can set a call incoming mode of the mobile communication terminal to a ringing tone, a vibrator or a display so that the selected mode is executed automatically depending on the location of the user.

The registered process executing means may comprise call incoming refusal selecting means for selecting one of setting and cancellation of call incoming refusal.

With this construction, the user of the mobile communication terminal can set or cancel the "call incoming refusal" execution service so that the selected mode is automatically depending on the location of the user.

The registered process executing means may comprise answer phone selecting means for selecting one of setting and cancellation of an answer phone service.

With this construction, the user of the mobile communication terminal can set or cancel the "answer phone" execution service so that the selected mode is automatically executed depending on the location of the user.

The registered process executing means may comprise call destination terminal setting execution means for executing setting of a call destination terminal.

With this construction, for example, the user of the mobile communication terminal can set an incoming call destined to a portable telephone set to automatically arrive at a domestic telephone set.

The registered process executing means may comprise screening setting means for setting screening for variable call incoming mode that depends on an attribute assigned to a call originator and a condition of the call originator.

With this construction, the user of the mobile communication terminal can set the screening to a private mode for preventing a business call from arriving when the user is at home or to a work mode for preventing a private call from arriving while the user is at work so that the selected mode is executed automatically depending on the location of the user.

BRIEF DESCRIPTION OF THE DRAWINGS

Other objects and further features of the present invention will be apparent from the following detailed description when read in conjunction with the accompanying drawing, in which:

FIG. 4 is a block diagram showing hardware of a mobile communication terminal receiving reported location information from a single communication network;

FIG. 7 shows an example of setting of screening;

FIG. 8 shows an example of setting of screening using the Internet;

FIG. 12 shows an example of registration of user-defined area names;

FIG. 13 shows an example of registration of execution service;

FIG. 16 shows an example of area-only mode;

FIG. 18 shows an example of Boolean operation by combination means;

FIG. 19 is a block diagram showing a system construction that implements the second embodiment;

FIG. 21 shows an example of registration of an execution service;

FIG. 22 shows an example of execution service;

DETAILED DESCRIPTION OF THE PREFERRED EMBODIMENTS

Figure 1:
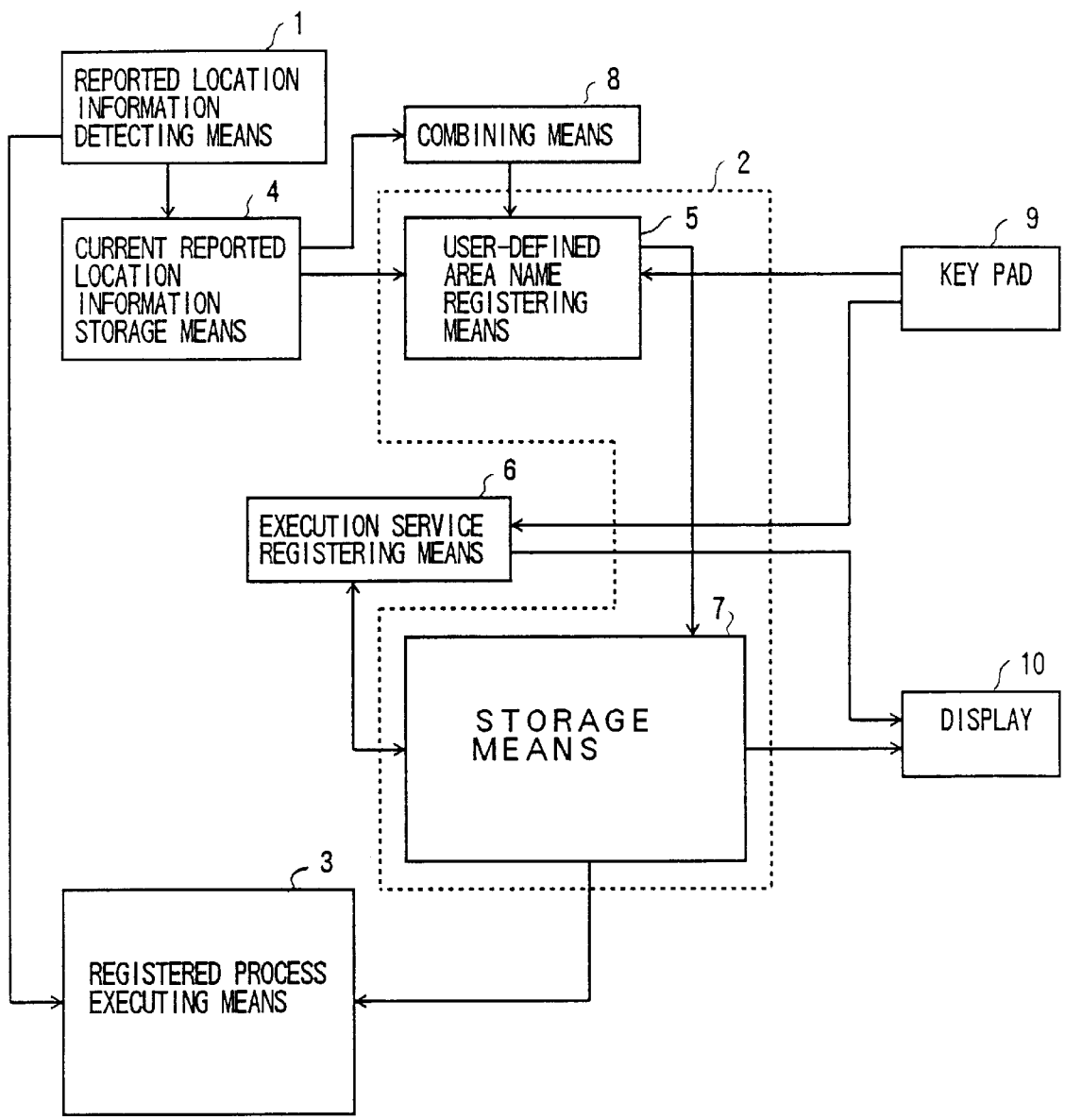
FIG. 1 shows a principle and construction of a mobile communication terminal according to a first embodiment of the present invention.

FIG. 1 shows a principle and construction of a mobile communication terminal according to a first embodiment of the present invention. When the reported location information reported by a base station agrees with the information managed by a mobile communication terminal, a registered process corresponding to the matching information is executed. The process executed subsequent to the reception of the matching information will now be referred to as an execution service.

Figure 5:
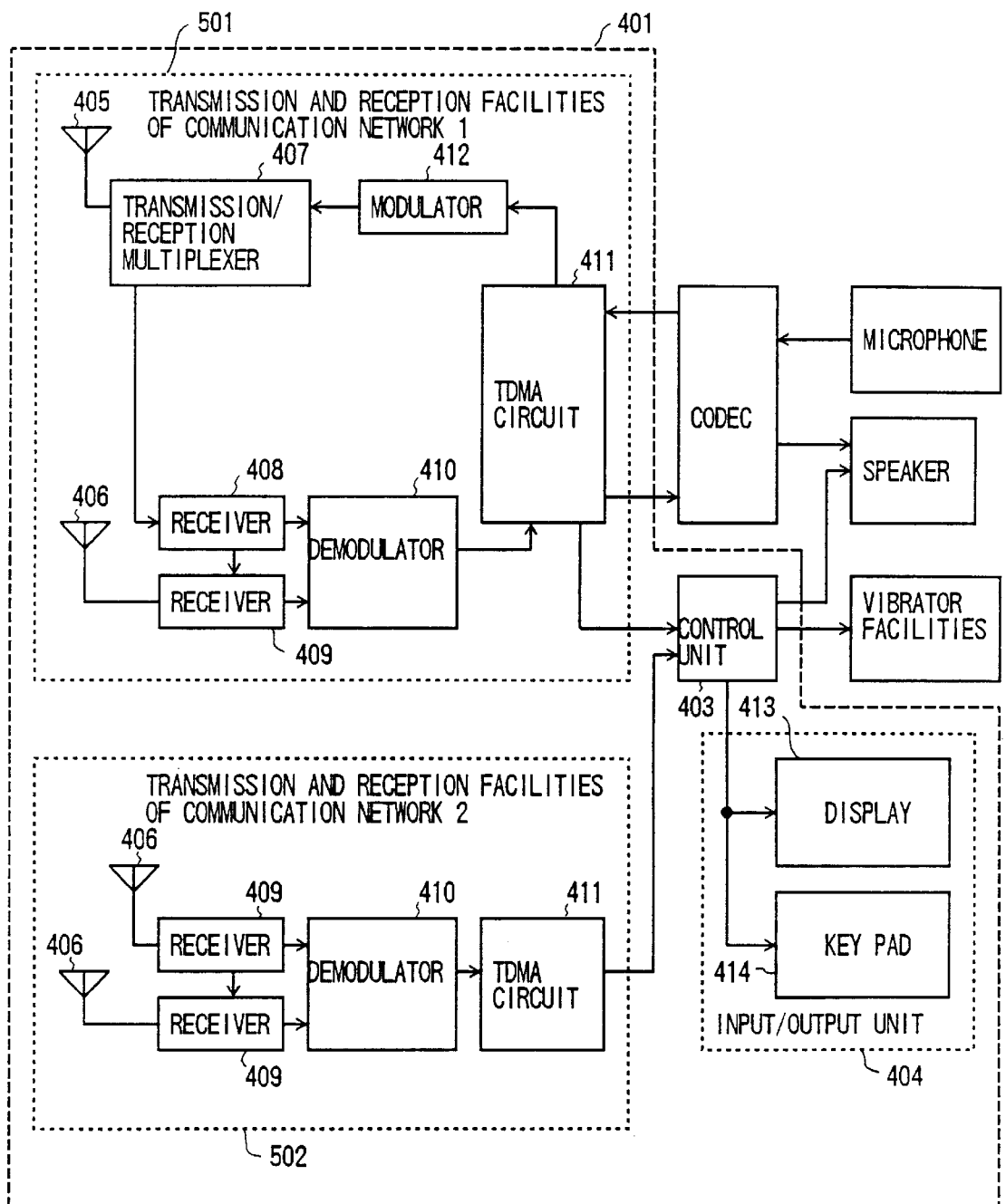
FIG. 5 is a block diagram showing hardware of a mobile communication terminal receiving reported location information from two communication networks.

FIG. 4 and FIG. 5 show hardware construction of a mobile communication terminal with which an execution service is executed. A receiver 408 of the mobile communication terminal receives location information, speech information and the like from a base station via an antenna 406. A receiver 409 of the mobile communication terminal receives the same via an antenna 405 and a common unit 407. A signal demodulated by a demodulator 410 is subject to a signal process by a TDMA (time division multiple access) circuit 411, and a sound signal from the TDMA circuit 411 is subject to a sound process by a CODEC and is output as a sound by a loud speaker. The CODEC of the mobile communication terminal subject a speech input from a microphone sound to a sound process. The output from the CODEC is transmitted to the TDMA circuit 411 for a signal process. The output from the TDMA circuit 411 is then transmitted via a modulator 412, a multiplexer 407 and an antenna 405.

Referring to FIG. 4, a location information processing unit 401 consists of a location information transmission and reception unit 402, a control unit 403 and an input and output unit 404. When the reported location information or the variation of the reported location information supplied from base stations of a single mobile communication network agrees with the information managed by the mobile communication terminal, a registered process corresponding to the matching information is realized. The location information transmission and reception unit 402 (equivalent to reported location information detecting means 1 of FIG. 1) detects the reported location information supplied from a base station, and transmits the location information to the mobile communication network. The control unit 403 is equivalent to reported location information managing means 2, registered process executing means 3, execution service registering means 6, current reported location information storage means 4, previous reported location information storage means 13, combination means 8 of FIG. 1). For example, the control unit 403 has facilities to register and automatically set a call incoming alert mode, call incoming refusal, answer phone facilities, a call destination terminal, and screening facilities. The input and output unit 404 is input means for inputting an execution service, a user-defined area name and a user-defined area vector name. The input and output unit 404 includes a key pad 414 to provide input facilities and a display 413 to provide display facilities.

Referring to FIG. 5, the location information processing unit 401 consists of a location information transmission and reception unit 501, a location information reception unit 502, the control unit 403 and the input and output unit 404. When the reported location information or the variation of the reported location information supplied from base stations of two mobile communication networks agrees with the information managed by the mobile communication terminal, a process corresponding to the matching information is realized. The location information transmission and reception unit 501 and location information reception unit 501 implement reported position information detecting means for detecting reported location information supplied from a base station. The location information transmission and reception unit 501 also transmits the associated location information to a mobile communication network. In the hardware construction of FIG. 5, those components that are identical to the corresponding components described with reference to FIG. 4 are designated by the same reference numerals, and the description thereof is omitted.

Referring to FIG. 1, means to execute an execution service of a mobile communication terminal consist of the reported location information detecting means 1, the current reported location information storage means 4, the combination means 8, the execution service registering means 6, the reported location information managing means 2, the registered process executing means 3, a key pad 9 and a display 10.

The reported location information detecting means 1 of the mobile communication terminal has facilities to detect the current reported location information from a single or several mobile communication networks.

The current reported location information storage means 4 has facilities to store the current reported location information detected by the reported location information detecting means 1.

The combination means 8 has facilities to determine a combination of reported location information to construct the smallest user-defined area specified by a user of a mobile communication terminal, and to express the combination in the form of a Boolean operation on the reported location information. The user of the mobile communication terminal can get a combination of several sets of reported location information from one or several mobile communication networks by moving from place to place carrying a mobile communication terminal.

The execution service registering means 6 has facilities to register an execution service that is to be executed when the reported location information or a combination of the reported location information corresponding to the user-defined area arbitrarily defined by the user is detected.

The reported location information managing means 2 consists of user-defined area name registering means 5 and storage means 7. The user-defined area name registering means 5 has facilities to register a user-defined area name corresponding to the reported location information detected by the reported location information detecting means 1 and stored in the current reported location information storage means 4, or corresponding to a Boolean operation result of the reported location information determined by the combination means. The storage means 7 has facilities to relate the user-defined area name registered by the user-defined area name registering means 5, the reported location information and the execution service registered by the execution service registering means 6.

The registered process executing means 3 has facilities to execute an execution service corresponding to the user-defined area when the reported location information detecting means 1 detects the reported location information corresponding to the user-defined area name. For example, the registered process executing means 3 has facilities to set a call incoming alert mode, call incoming refusal, answer phone facilities, a call destination terminal, and screening facilities.

The key pad 9 implements the input means. The user-defined area name and the execution service registered by the user-defined area name registering means 5 and the execution service registering means 6, respectively, are input using the key pad 6.

The display 10 implements display means and has facilities to display information stored in storage means 7 and a screen image that prompts registration of an execution service.

A description will now be given of a process for executing an execution service corresponding to a predetermined user-defined area name, when the reported location information or the variation of the reported location information supplied from a base station agrees with the user-defined area name.

Figure 6:
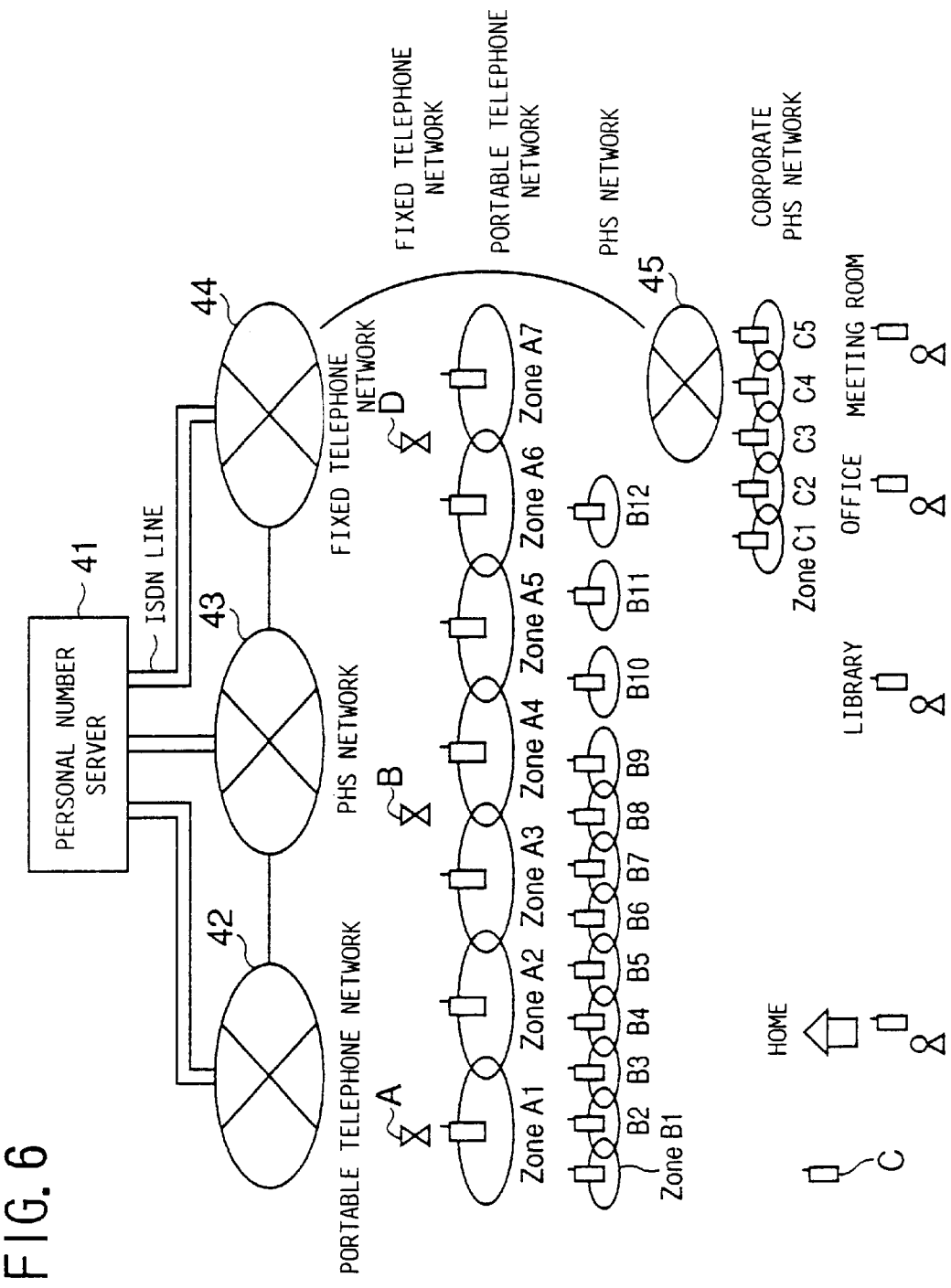
FIG. 6 is a block diagram showing a system construction that implements the first embodiment.

FIG. 6 shows a construction of a communication system according to the first embodiment of the present invention. This communication system consists of communication networks such as a mobile telephone network 42, a PHS network 43, a fixed telephone network 44, and a corporate telephone network 45. Base stations are deployed in the mobile communication network 42, the PHS network 43 and the corporate telephone network 45. The base stations of the mobile communication network 42 cover areas ZoneA7 through ZoneA1. The base stations of the PHS network 43 cover areas ZoneB12 through ZoneB1. The base stations of the corporate telephone network 45 cover areas ZoneC5 through ZoneC1.

A personal number server 41 manages location information of a mobile communication terminal and offers communication service to the mobile communication terminal when a personal number specifying an individual is dialed. For example, the personal number server 41 offers services such as setting of call incoming refusal, setting of answer phone facilities, setting of a call destination terminal, and setting of a screening. An ISDN line connects each of the telephone networks 42, 43, 44 and 45 with the personal number server 41. The personal number server 41 can distinguish between call originator number of the telephone network 42, 43, 44 and 45. After a call originator is connected to the personal number server 41, the personal number server 41 can distinguish between call originators by the call originator dialing a PID which is assigned to the call originator.

The user receiving service of the personal number server 41 can register a call incoming terminal in the personal number server 41. For example, the user can designate which terminal a call for the user is to arrive at, by sequentially inputting a personal number service number, a PID of the user, a TID indicating a terminal number of at which a call is to arrival. If a terminal registered thus is an ISDN terminal capable of notifying a destination of the terminal number, the user may omit an input of the TID. The personal number server 41 detecting the PID of the call destination retrieves the terminal number TID corresponding to the PID of the call destination so as to determine a terminal and call the call destination terminal. When the call destination terminal replies, the personal number server 41 connects between a call receiver and a call originator, thus shifting to state that enables a call to proceed.

A user may also benefit from screening service from the personal number server 41. The screening service is the function that is utilized to selectively receive incoming calls in personal communication and mobile communication. For example, one may not want a business call to arrive when at home, and may not want a private call to arrive during work. Accordingly, the screening service defines a work mode and a private mode. For example, as shown in FIG. 7, a user can register each call destination as a private destination or a work destination, using a mobile communication terminal. For example, as shown in FIG. 8, the user can make a registration in the personal number server 41 via the Internet. When the registration is completed, the mobile communication terminal retrieves a PID of a call originator when there is an incoming call. In the private mode, the mobile communication terminal lets only incoming calls from a destination preset as a private destination arrive. In the work mode, the mobile communication terminal lets only incoming calls preset as a work destination arrive. This service operates such that a user sequentially inputs a personal number service number, a PID of the user, a service number indicating screening, a service number indicating a work mode or a private mode. For example, in the private mode, the personal number server 41 lets a call originator hear guidance and start an answer phone service, for an incoming call from a person preset as a work A similar process for storing the reported location information is also performed in a PHS terminal.

A description will now be given of a process whereby a user of a portable telephone set registers a user-defined area name for the reported location information stored in the current reported location information storage means 4. The process whereby a user-defined area name of "home" is newly registered in the reported location information "ZoneA2" will be described with reference to FIG. 23. Because the an area indicated by the reported location information is not recognized when the user adds a new user-defined area name, the reported location information detecting means 1 detects the reported location information at a place to which the user-defined area name is to be attached so that the registration can be performed.

The user of a portable telephone set determines whether registration of a home area is new and performs a user-defined area name registering operation using the key pad 9 (S1).

When it is determined that the registration is new (S1, YES), the reported location information managing means 2 determines whether a single or plural sets of detected reported location information is detected (S2). Assuming that the reported location information is singular, the reported location information managing means 2 retrieves the current reported location information "ZoneA2" from the current reported location information storage means 4 (S3). The reported location information managing means 2 searches the storage means 7 for the user-defined area name that corresponds to the reported location information "ZoneA2" (S4). When it is determined that there is not a user-defined area name that corresponds to the reported location information as a result the search destination.

The user can also benefit from the answer phone facilities provided by the personal number server 41. This service operates such that a user sequentially inputs a personal number service number, a PID of the user, a service number indicating answer phone facilities, and a service number indicating setting or cancellation.

A user can benefit from call incoming refusal service provided by the personal number server 41. This service operates such that a user sequentially inputs a personal number service number, a PID of the user, a service number indicating a call incoming mode, and a service number indicating setting or cancellation.

A mobile communication terminal is also provided with means to change a call incoming alert mode. For example, a mobile communication terminal can select call incoming by a ringing tone, call incoming by a vibration, or call incoming only by a call incoming display.

Figure 9:
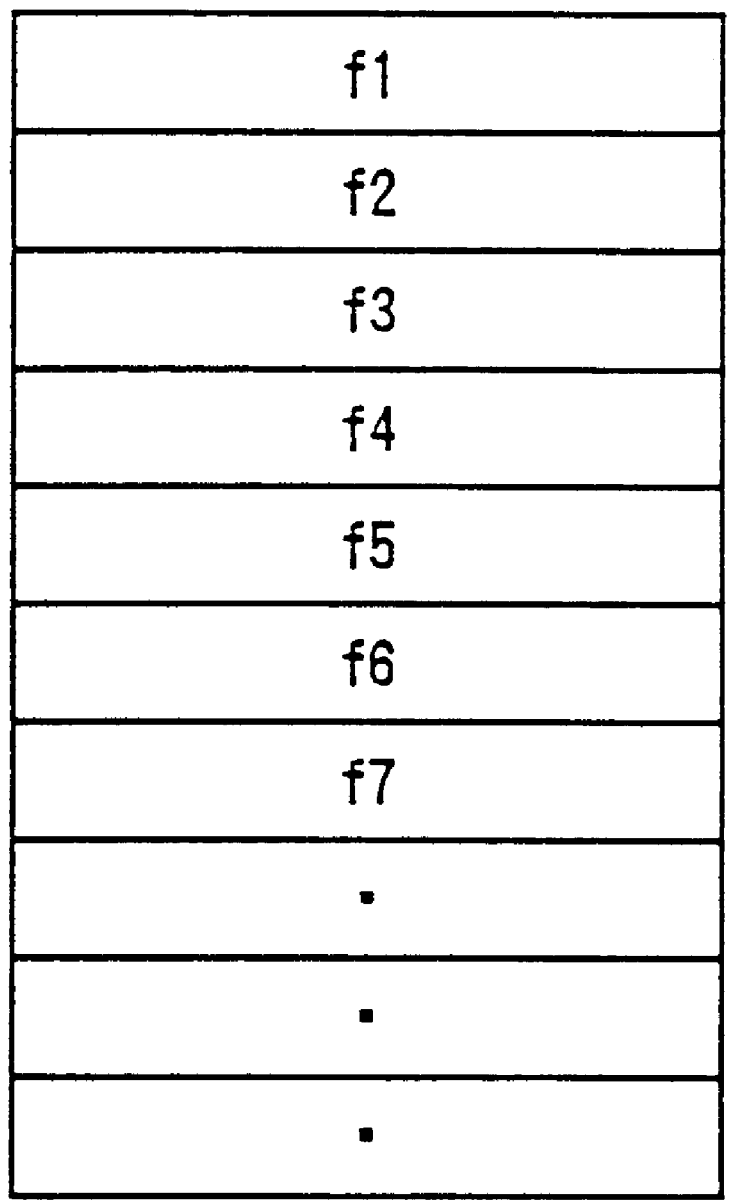
FIG. 9 shows an example of perch channels.
Figure 10:
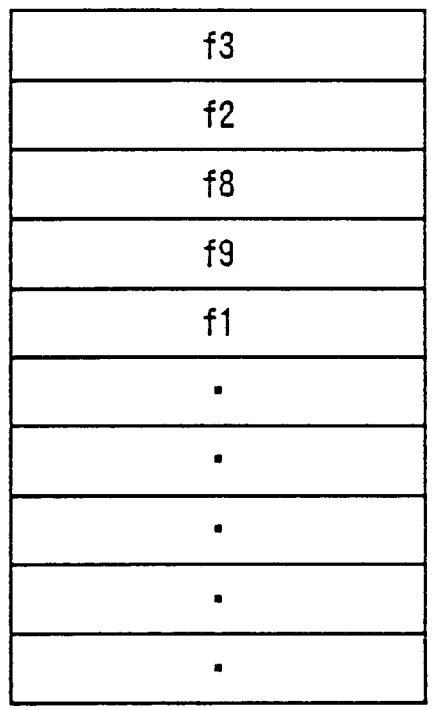
FIG. 10 shows an example of perch frequency sorted table.
Figure 11:
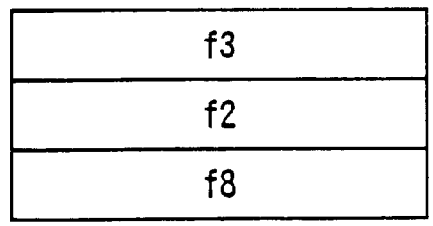
FIG. 11 shows an example of current reported location information storage means.

At home (FIG. 6), the reported location information detecting means 1 of a portable telephone set detects ZoneA2. As shown in FIG. 9, the reported location information detecting means 1 of the portable telephone set detects all radio waves over the perch channels detectable by the portable telephone set. For example, as shown in FIG. 10, the reported location information detecting means 1 arranges the channels in the order of quality of reception of the radio wave, so as to generate a perch frequency sorted table. The reported location information detecting means 1 of the portable telephone set retrieves the reported location information in a frequency band in which a predetermined reception level is exceeded, and stores the retrieved reported location information in the current reported location information storage means 4. by the reported location information managing means 2 searched (S5, NO), the user of the portable telephone set inputs a user-defined area name using the key pad 9. For example, the user may input "home" (S6). The user-defined area name registering means 5 registers the user-defined area name "home" and the reported location information "ZoneA2" in the storage means 7 (S7). If the user-defined area name that corresponds to the reported location information is found as a result of the search by the reported location information managing means 2 (YES in S5), the reported location information managing means 2 reads out the user-defined area name that corresponds to the reported location information from the storage means 7, and displays the user-defined area name on the display 10 (S8). When the user-defined area name displayed is to be changed (S9, change), the user of the portable telephone set inputs "home" as a user-defined area name using the key pad 9 (S6), so that the user-defined area name registering means 5 registers the user-defined area name "home" and the reported location information "ZoneA2" in the storage means 7 (S7). When the user-defined area name displayed is to be retained (S9, retain), the user of the portable telephone set does nothing, thus ending the process. When the user-defined area name displayed is not needed (S9, delete), the user of the portable telephone set provides an input instructing deletion of data using the key pad 9, so that the reported location information managing means 2 eliminates the user-defined area name that corresponds to the reported location information stored in the storage means 7 (S10).

When the registration is not new (S1, NO), the user of the portable telephone set inputs a user-defined area name using the key pad 9 (S1), and the reported location information managing means 2 searches the storage means 7 for the user-defined area name (S12). When the user-defined area name is not found as a result of the search by the reported location information managing means 2 (S13, NO), the aforementioned steps are repeated. When the use-defined area name is found (S13, YES), the reported location information managing means 2 reads out the user-defined area name from the storage means 7 so as to display the same on the display 10 (S8). When the user-defined area name displayed is to be changed (S9, change), the user of the portable telephone set inputs "home" as a user-defined area name using the key pad 9 (S6), so that the user-defined area name registering means 5 registers the user-defined area name "home" and the reported location information "ZoneA2" in the storage means 7 (S7). When the user-defined area name displayed is to be retained (S9, retain), the user of the portable telephone set does nothing, thus ending the process. When the user-defined area name displayed is not needed (S9, delete), the user of the portable telephone set provides an input instructing deletion of data using the key pad 9, so that the reported location information managing means 2 eliminates the user-defined area name that corresponds to the reported location information stored in the storage means 7 (S10).

Figures 14A, 14B:
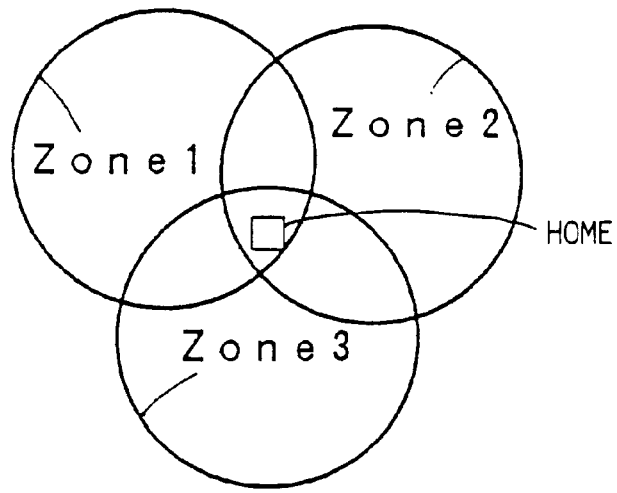
FIG. 14 shows an example of registration of a user-defined area name for a plurality of sets of reported location information from a single mobile communication network.
Figures 15A, 15B:
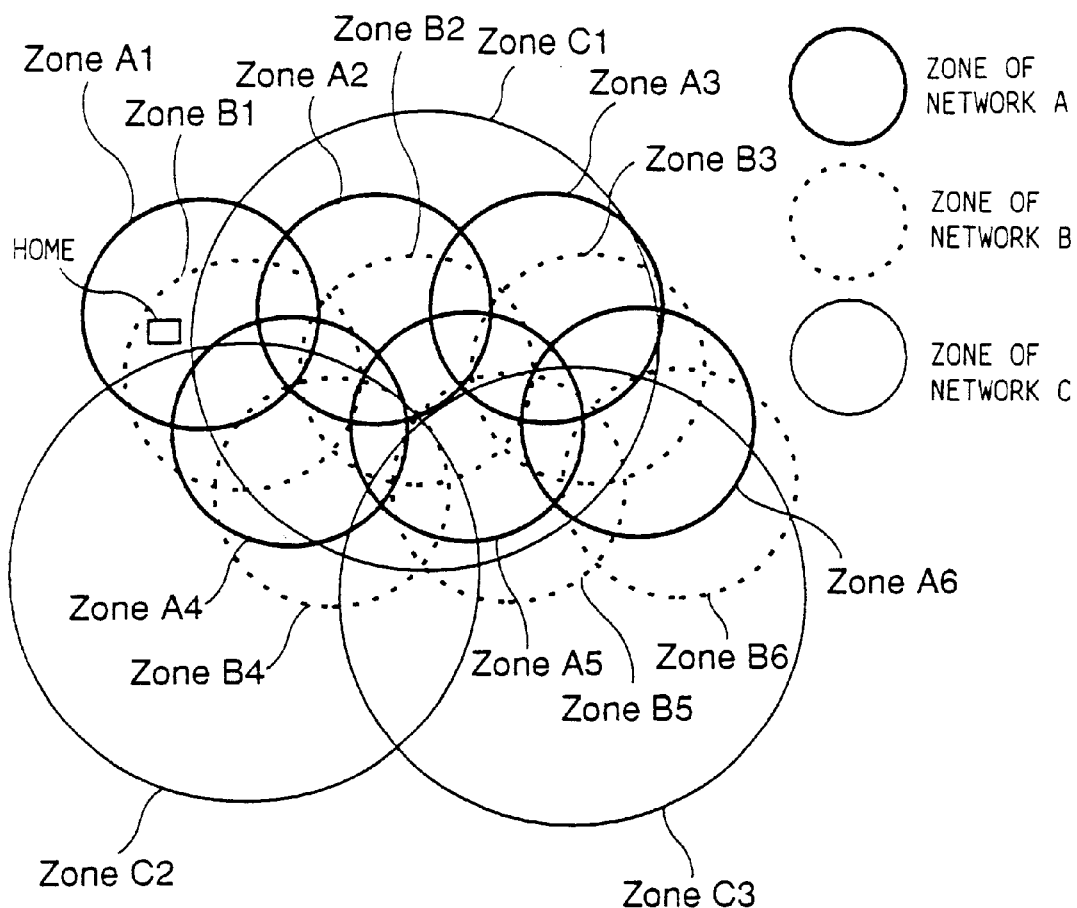
FIG. 15 shows an example of registration of a user-defined area name for reported location information from a plurality of mobile communication networks.

For example, as shown in FIGS. 14A and 14B, when a PHS terminal or a portable telephone set detects the reported location information "Zone1", "Zone2" and "Zone3" from a single communication network, a result of a Boolean operation (Zone1) and (Zone2) and (Zone3) may be registered so as to correspond to the user-defined area name "home". When a PHS terminal or a portable telephone set detects reported location information "ZoneA1" and "ZoneB1" from a plurality of communication networks, as shown in FIGS. 15A and 15B, a result of a Boolean operation (ZoneA1) and (ZoneB1) may be registered so as to correspond to the user-defined area name "home". When a user-defined area name is registered for several sets of reported location information from a single communications network, or for reported location information from several communications networks, the area covered by the reported location information can be enlarged or reduced. Such a feature is not available when a user-defined area name is registered for a single set of reported location information.

A description will now be given of a process whereby the user of the portable telephone set registers "home" as a user-defined area name for the area as shown in FIG. 18, with reference to the flow chart shown in FIG. 23.

The user of the portable telephone set moves between points (1), (2), (3) and (4) in the stated order so as to detect respective reported location information (S14). The combination means 8 stores (Zone1) and (Zone2) and (Zone3) and (Zone5) as the reported location information for point (1). (Zone1) and (Zone2) and (Zone4) and (Zone5) is stored as the reported location information for point (2). (Zone1) and (Zone2) and (Zone3) and (Zone4) and (Zone5) is stored as the reported location information for point (3). (Zone1) and (Zone2) and (Zone3) and (Zone5) is stored as the reported location information for point (4) (S15). Based on the reported location information at points (1) through (4), the combination means 8 determines a Boolean operation on the reported location information indicating a zone that includes an area which the user of the portable telephone set wants to be registered (S16). The Boolean operation in this case (Zone1) and (Zone2) and (Zone5). The reported location information managing means 2 registers "home" as a user-defined area name for this Boolean operation result (S17).

The reported location information managing means 2 searches the storage means 7a for the user-defined area name associated with the Boolean operation result (Zone1) and (Zone2) and (Zone5) of the reported location information. When it is determined as a result of the search by the reported location information managing means 2 that there is not a user-defined area name that corresponds to the Boolean operation result of the reported location information (S5, NO), the user of the portable telephone set inputs "home" as a user-defined area name using the key pad 9 (S6) so that the user-defined area name registering means 5 registers the user-defined area name "home", and the associated Boolean operation result (Zone1) and (Zone2) and (Zone5) of the reported location information, in the storage means 7 (S7). If the user-defined area name that corresponds to the Boolean operation result of reported location information is found (S5, YES), the reported location information managing means 2 reads out the user-defined area name that corresponds to the Boolean operation result of the reported location information from the storage means 7, so as to display the user-defined area name thus read on the display 10 (S8). When the user-defined area name displayed is to be changed (S9, change), the user of the portable telephone set inputs "home" as a user-defined area name using the key pad 9 (S6), so that the user-defined area name registering means 5 registers the user-defined area name "home" and the Boolean operation result (Zone1) and (Zone2) and (Zone5) of the reported location information in the storage means 7 (S7). When the user-defined area name displayed is to be retained (S9, retain), the user of the portable telephone set does nothing, thus ending the process. When the user-defined area name displayed is not needed (S9, delete), the user of the portable telephone set provides an input instructing deletion of data using the key pad 9, so that the reported location information managing means 2 eliminates the user-defined area name that corresponds to the Boolean operation result of the reported location information stored in the storage means 7 (S10).

Referring to FIG. 6, the above description of the flow of registration of the reported location information "ZoneA2" detected by the portable telephone set and the user-defined area name "home", also applies to a PHS terminal.

Figure 23:
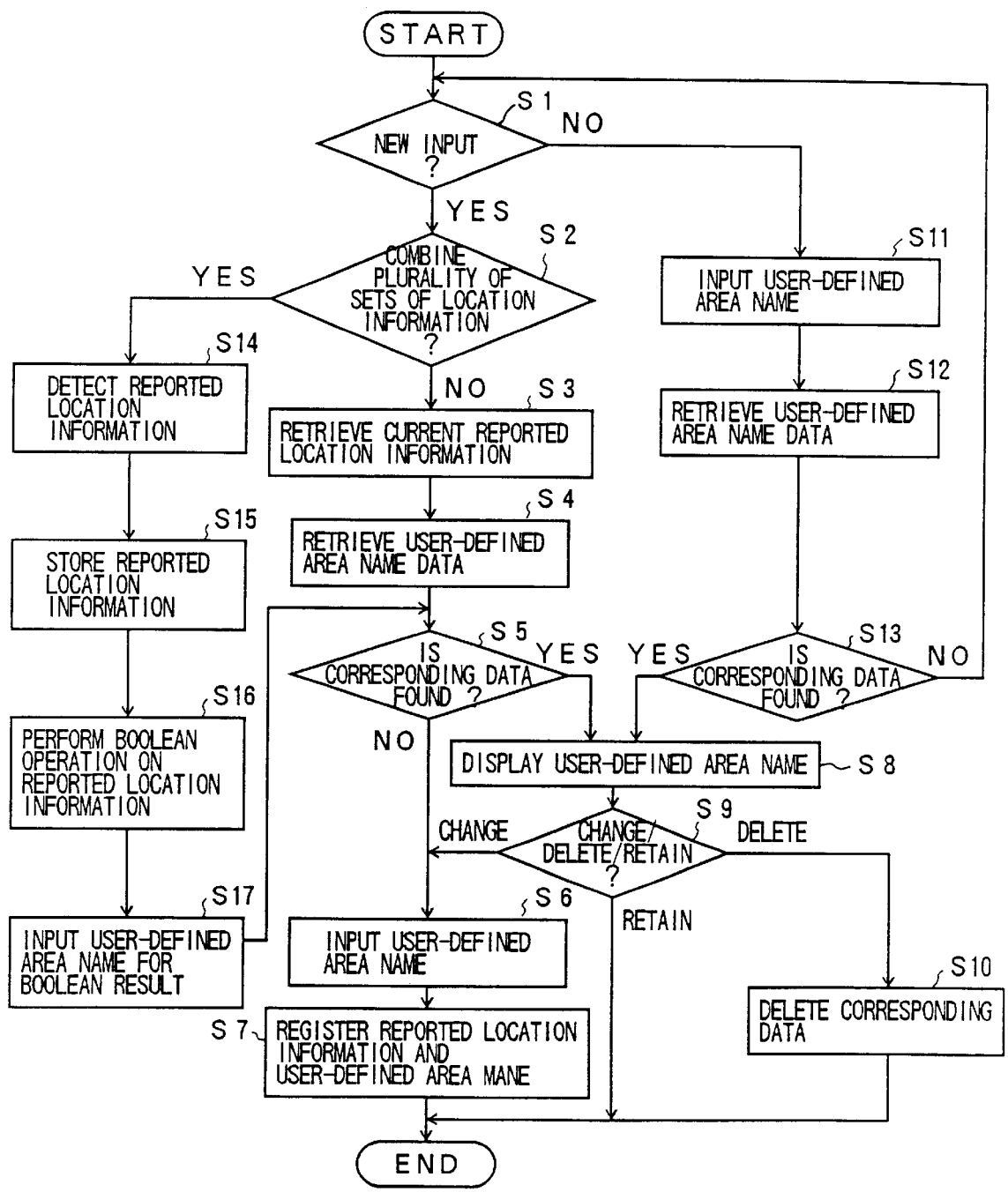
FIG. 23 shows an example of a process for registration of a user-defined area name.

For example, according to the flow chart of FIG. 23, the user of the PHS terminal registers a user-defined area name "home" for the reported location information "ZoneB4", a user-defined area name "office" for the reported location information "ZoneC2", a user-defined area name "meeting room" for reported location information "ZoneC5" and a user-defined area name "library" for reported location information "ZoneB10". The reported location information managing means 2 relates the reported location information and the user-defined area names in the storage means 7 in such a manner as to relate the reported location information to the corresponding user-defined area name.

When the registration of the user-defined area names is completed, the user of the PHS terminal registers a execution service, as shown in FIG. 13.

A description will now be given, with reference to FIG. 24, of a process for registering an execution service in relation to the reported location information and the user-defined area name registered in the storage means 7.

The user of the PHS terminal performs an operation for registering an execution service using the key pad 9. The execution service registering means 6 reads out the user-defined area names "home", "office", "meeting room", and "library" from the storage means 7 and displays the list on the display 10 (S31). For example, the user of the PHS terminal selects, using the key pad 9, "home" as the user-defined area name with which the user wants an execution service to be registered (S21, S32).

The execution service registering means 6 displays a list of registered execution 1 services on the display 10 when the user-defined area name "home" is selected, the user of the PHS terminal selects, for example, "setting of call incoming alert mode" as the associated execution service, using the key pad 9 (S33). When the execution service is selected, the execution service registering means 6 displays a screen image on the display 10 so as to prompt selection of the type of the execution service.

If the user of the PHS terminal selects an execution service provided by automatically dialing the personal number server 41 when the reported location information that corresponds to the user-defined area name is detected, that is, if the user registers setting of screening, setting of answer phone facilities, setting of call incoming refusal, setting of a call destination terminal, selection of a setting mode or the like, the user selects "automatic dialing" as the type of the execution service. If the user registers an execution service which is automatically set in the PHS terminal, that is, if the user registers setting of a call incoming alert mode, the user selects "call mode" as the type of the execution service (S34). Once the type of the execution service is selected, the execution service registering means 6 displays a screen which prompts setting of information necessary for the execution service, on the display 10. Since it is assumed that the user registers the execution service for the user-defined area name "home", the user of the PHS terminal inputs "sound" as the information necessary for setting of the call incoming alert mode (S22, S35).

The execution service registering means 6 relates the "sound" set in the call incoming alert mode to the reported location information "ZoneB4" and the user-defined area name "home", and registers the relation in the storage means 7 (S23).

After completing registration of the "sound" set in the call incoming alert mode, the user of the PHS terminal performs an operation to register the execution service using the key pad 9 once again, so that the execution service registering means 6 reads out the user-defined area names "home", "office", "meeting room", and "library" from the storage means 7 and displays the list on the display 10 (S31). The user of the PHS terminal selects, using the key pad 9, the user-defined area name "home" with which the user wants an execution service to be registered (S21, S32).

The user-defined area name "home" is selected, the execution service registering means 6 displays a list of registered execution services on the display 10, whereupon the user of the PHS terminal selects "selection of setting mode" as the execution service, using the key pad 9 (S33).

Figure 17:
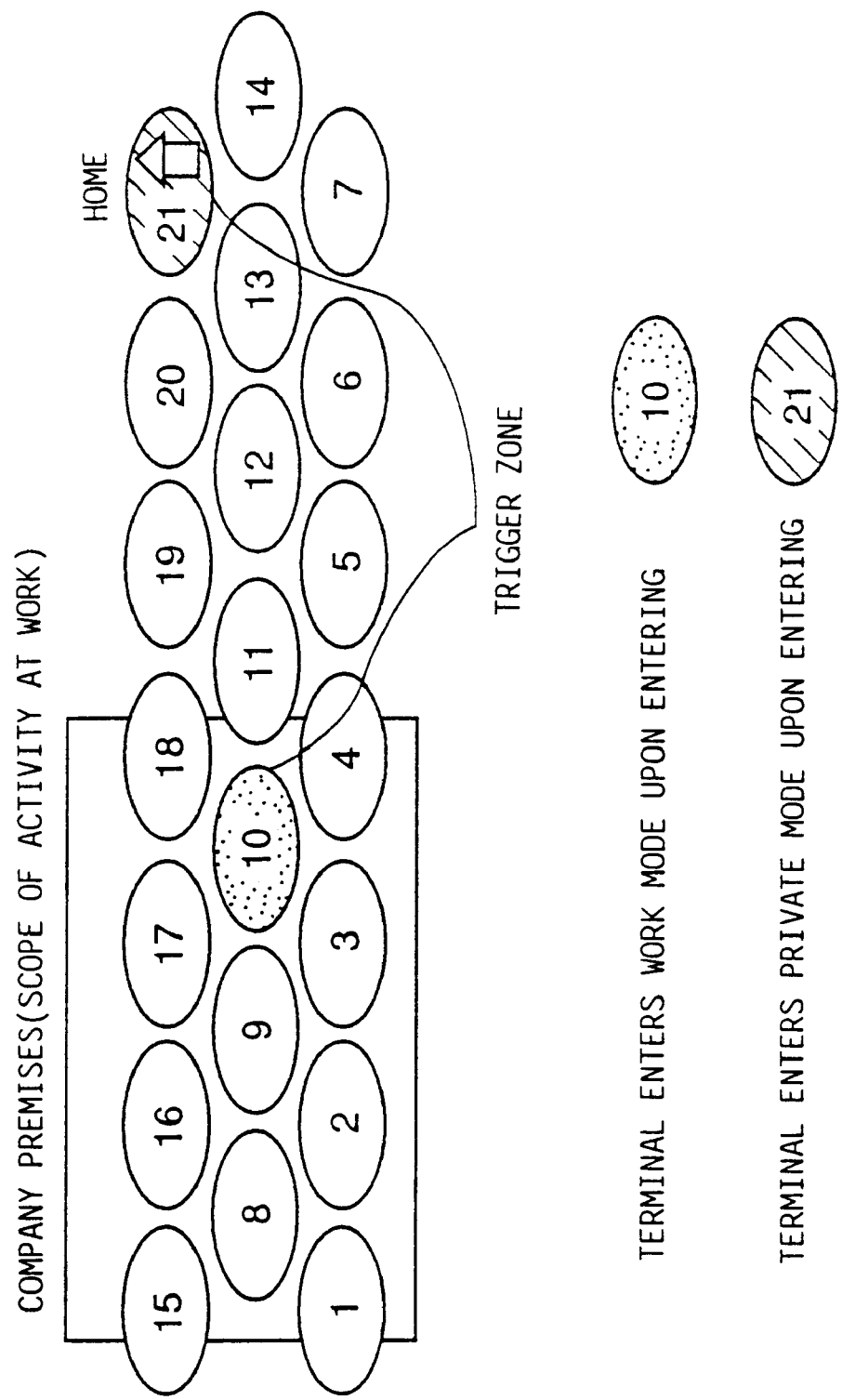
FIG. 17 shows an example of triggered-execution mode.

When the reported location information "ZoneB4" that corresponds to the user area name "home" is detected, the execution service set up for the area may continue to be "retained" even after the user leaves the area that corresponds to "home", as shown in FIG. 17. Such a mode will be referred to as a triggered execution mode. Alternatively, the execution service which was retained before the execution service that corresponds to the new user-defined area name "home" may be stored in the storage means 7 so that the execution service that corresponds to the user-defined area name "home" may be executed. In this case, the terminal reverts to the execution service stored in the storage means 7 when the user leaves the area that corresponds to the user-defined name "home", as shown in FIG. 16. Such a mode will be referred to as an area-only mode.

The area-only mode requires that the reported location information is detected while the user is moving from place to place when registering a user-defined area name. This mode is used in case a user-defined area is relatively narrow.

When registering a user-defined area name in the "triggered execution mode", the user does not need to move from place to place. The user registers a user-defined area name on the spot. Accordingly, this mode is used when a user-defined area is relatively large.

When an execution service is selected, the execution service registering means 6 displays a screen image on the display 10 prompting a selecting of a type of execution service. Assuming that the user of the PHS terminal wants to execute registration of a selection of setting mode as an execution service, the user selects "auto-dial" (S34). When the type of execution service is selected, the execution service registering means 6 displays a screen image on the display 10 prompting setting of information necessary for the execution service, whereupon the user of the PHS terminal inputs dial information for the area-only mode as the information necessary for setting the call incoming alert mode (S22, S35).

The execution service registering means 6 relates the above selection of the area-only mode as the setting mode, to the reported location information "ZoneB4", the user-defined area name "home" and the "sound" set up for the call incoming alert mode. The execution service registering means 6 registers the relation in the storage means 7 (S23). After the registration of the selection of the area-only mode as the setting mode is completed, the user of the PHS terminal performs an operation to register an execution service using the key pad 9 once again. The execution service registering means 6 reads out user-defined area names "home", "office", "meeting room", "library" from the storage means 7 and displays the list on the display 10 (S31). The user of the PHS terminal selects the user-defined area name "home" with which the user wants an execution service to be registered, using the key pad 9 (S21, S32).

When the user of the PHS terminal selects the user-defined area name "home", the execution service registering means 6 displays a list of registered execution services on the display 10, whereupon the user selects "setting of screening" as an execution service, using the key pad 9 (S33). When the execution service is selected, the execution service registering means 6 displays a screen image prompting selection a type of execution service on the display 10. Assuming that registration of setting of screening is executed as an execution service, the user of PHS terminal selects "auto-dial" (S34). When the type of execution service is selected, the execution service registering means 6 displays a screen image on the display 10 prompting setting of information necessary for the execution service, whereupon the user of the PHS terminal inputs dial information for the private mode as the information necessary for setting the screening (S22, S35). The execution service registering means 6 relates the above screening setting "private" to the reported location information "ZoneB4" and the user-defined area name "home", and registers the relation in the storage means 7 (S23).

After the registration of the "private" screening is completed, the user of the PHS terminal performs an operation to register an execution service using the key pad 9 once again. The execution service registering means 6 reads out user-defined area names "home", "office", "meeting room", "library" from the storage means 7 and displays the list on the display 10 (S31). The user of the PHS terminal selects the user-defined area name "home" with which the user wants an execution service to be registered, using the key pad 9 (S21, S32). When the user of the PHS terminal selects the user-defined area name "home", the execution service registering means 6 displays a list of registered execution services on the display 10, whereupon the user selects "selection of setting mode" as an execution service, using the key pad 9 (S33).

When an execution service is selected, the execution service registering means 6 displays a screen image on the display 10 prompting a selecting of a type of execution service. Assuming that the user of the PHS terminal wants to execute registration of a selection of setting mode as an execution service, the user selects "auto-dial" (S34). When the type of execution service is selected, the execution service registering means 6 displays a screen image on the display 10 prompting setting of information necessary for the execution service. Because the screening setting "private" is not limited to home but is applied outside home, the user of the PHS terminal inputs "triggered execution mode" as the information necessary for setting a call incoming alert mode (S22, S35).

The execution service registering means 6 relates the above selection of the "triggered execution mode" as the setting mode, to the reported location information "ZoneB4", the user-defined area name "home" and the call incoming setting of "private". The execution service registering means 6 registers the relation in the storage means 7 (S23). After completing the registration of the execution service for the user-defined area name "home", the user of the PHS terminal registers an execution service for the user-defined area names "office", "meeting room", and "library" according to the flow chart of FIG. 24. FIG. 23 shows an example of different execution services registered in association with different user-defined area names.

Figure 25:
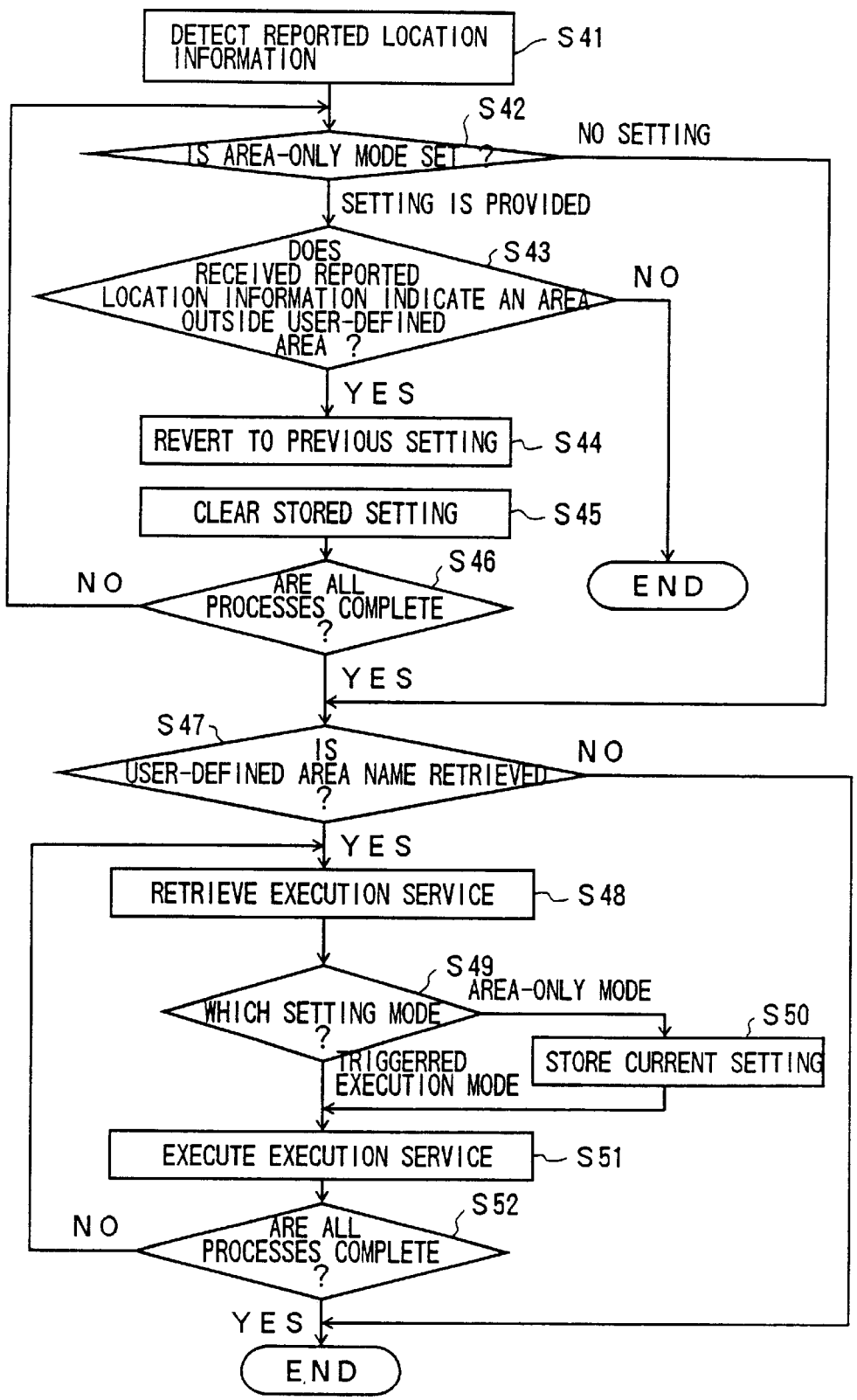
FIG. 25 is a flowchart for automatic execution of an execution service.

When registration of execution services in association with user-defined area names is completed, and when the reported location information detecting means 1 of the PHS terminal detects the reported location information "ZoneB4" "ZoneC2", "ZoneC5", and "ZoneB10" corresponding to the user-defined area names "home", "office", "meeting room", and "library" from a base station, the registered process executing means 3 automatically executes an execution service corresponding to the user-defined area name. A description will be given, with reference to FIG. 25, of how an execution service is automatically executed.

When the reported location information detecting means 1 detects reported location information from a base station (S41), the registered process execution means 3 examines whether there is any execution service currently set up to be executed in the area-only mode (S42).

When there is an execution service set up for the area-only mode (YES in S42), the registered process execution means 3 examines whether the newly detected reported location information indicates an area outside the user-defined area corresponding to the execution service that is now set up (S43). If the newly detected reported location information indicates an area outside the user-defined area corresponding to the execution service currently set up (S43, YES), the registered process execution means 3 retrieves the immediately preceding setting of execution service from the storage means 7, and dials a personal service number so as to provide an automatic setting in the personal number server 41 (S44), and then clears the immediately preceding setting of execution service recorded in the storage means 7 (S45). Processes from step 42 to step 46 are repeated till the registered process execution means 3 examines whether setting about every execution service was completed (S46), and setting about all execution service is completed (S46, YES) (S46, NO). The registered process execution means 3 examines whether the setting for each execution service is completed (S46). Processes from step 42 to step 46 are repeated until the setting for each execution service is completed (S46, YES) (S46, NO). If the newly detected reported location information indicates an area in the user-defined area corresponding to the execution service that is currently set up (S43, No), the setting of the current execution service is maintained.

When there is not any execution service set up for the area-only mode (S42, NO) or when it is determined in step 46 that the registered process execution means 3 has completed the setting for each execution service (S46, YES), the storage means 7 is examined to determine whether a user-defined area name corresponding to the newly detected reported location information is stored therein (S47).

When the user-defined area name corresponding to the newly detected reported location information is not stored in the storage means 7 (S47, NO), the registered process execution means 3 maintains the current setting of execution service.

For example, when the user-defined area name corresponding to the newly detected reported location information is stored in the storage means 7, that is, for example, when the user-defined area name "home" corresponding to the reported location information "ZoneB4" is stored in the storage means 7 (S47, YES), the registered process execution means 3 retrieves the "setting of call incoming alert mode" execution service corresponding to the user-defined area name "home" from the storage means 7 (S48), and examines whether the setting mode is the triggered execution mode or the area-only mode (S49). Because the execution service "setting of a call incoming alert mode" corresponding to the user-defined area name "home" operates in the area-only mode (S49, area-only mode), the registered process execution means 3 stores the current setting of a call incoming alert mode in the storage means 7 (S50) and sets the call incoming alert mode of the PHS terminal to "sound" (S51). The registered process execution means 3 examines the storage means 7 to determine whether there are other execution services (S52).

Because the storage means 7 stores the execution service "screening setting" corresponding to the user-defined area name "home" (S52, NO), the registered process execution means 3 retrieves the execution service "screening setting"

corresponding to the user-defined area name "home" from the storage means 7 (S48), and determines whether the setting mode is the triggered execution mode or the area-only mode (S49). As the execution service "screening setting"corresponding to the user-defined area name "home" operates in the triggered execution mode (S49, triggered execution mode), the registered process execution means 3 stores the current screening setting in the storage means 7 (S50), and performs an auto-dial operation in the order of a personal number service number, a PID of a call originator, a service number indicating the screening, a service number indicating the private mode so as to set the screening to "private" (S51). In step 51 of the first embodiment, the registered process execution means 3 auto-dials the personal number server 41, so that the personal number server 41 executes the screening setting for the PHS terminal. When the PHS terminal is provided with screening setting facilities, the execution service "screening setting" corresponding to the newly detected reported location information is read out from the storage means 7, so that the automatic setting of screening is executed in the PHS terminal.

The registered process execution means 3 examines the storage means 7 to determine whether there are other execution services (S52). Because there are no other execution services corresponding to the user-defined area name "home", the automatic execution of execution service is terminated.

Automatic execution of the execution service as described above based on the flow chart of FIG. 25 is also performed for user-defined area names other than the user-defined area name "home", that is, for user-defined area names "office", "meeting room", and "library". Automatic execution of execution services other than the execution services "setting of call incoming alert mode" and "screening setting" described above are performed as described below. In setting the answer phone facilities, the registered process execution means 3 sequentially auto-dials an answer phone facilities number and a parameter (setting, cancellation). In setting the call incoming refusal, the registered process execution means 3 sequentially auto-dials a call incoming refusal number and a parameter (setting, cancellation). When the PHS terminal is provided with facilities for setting the answer phone facilities and the call incoming refusal, the execution service is not performed by auto-dialing. Instead, the execution services "setting of answer phone facilities" and "setting of call incoming refusal" corresponding to the newly detected reported location information are read out from the storage means 7, so that the automatic setting of screening is performed in the PHS terminal. An execution service may be set so as not to be automatically executed.

When the information position detection means 1 detected the reported location information corresponding to the user-defined area, an execution service may be performed after providing a notification (a sound or display) for confirmation with the user of the PHS terminal.

Referring to FIG. 6, when the reported location information detecting means 1 of the PHS terminal detects the user-defined area names "home", "office", "meeting room", and "library" corresponding to the reported location information "ZoneB4", "ZoneC2", "ZoneC5", and "ZoneB10" from a base station, the execution service corresponding to the user-defined area name is executed automatically. Such a flow of operation may also be applied to a portable telephone set.

Figure 2:
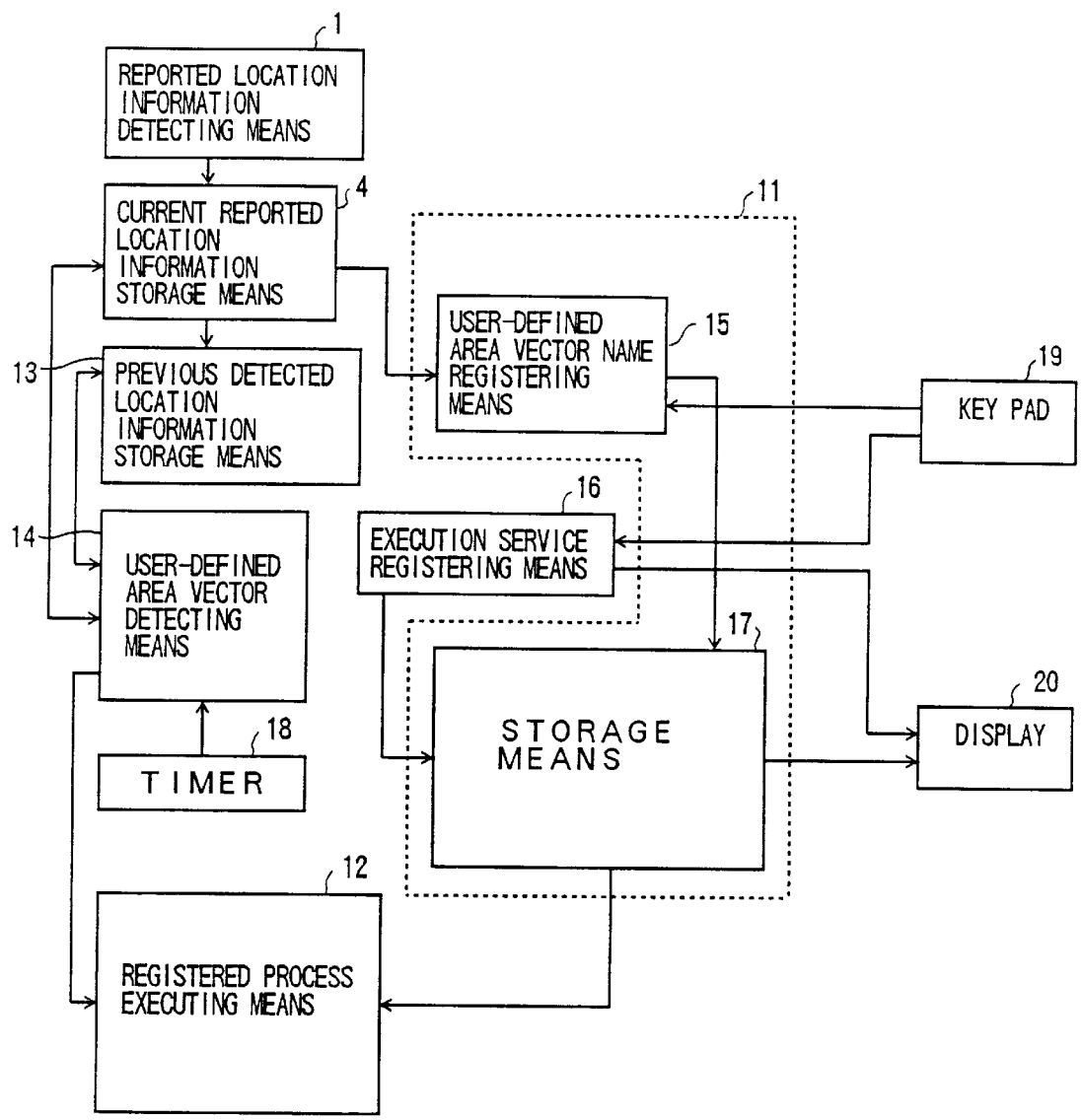
FIG. 2 shows a principle and construction of a mobile communication terminal according to a second embodiment of the present invention.

FIG. 2 shows a principle and construction of a mobile communication terminal according to a second embodiment of the present invention. In FIG. 2, those components that are identical to the corresponding components of FIG. 1 are designated by the same reference numerals, and the description thereof is omitted.

In the second embodiment, when a designated variation of the reported location information supplied from a base station agrees with the information managed by a mobile communication terminal, a registered process corresponding to the information is performed. Means to implement execution of the execution service according to the second embodiment is the same as the corresponding means in the hardware construction according to the first embodiment shown in FIGS. 4 and 5.

Referring to FIG. 2, means to execute an execution service of a mobile communication terminal consist of the reported location information detecting means 1, the current reported location information storage means 4, the previous reported location information storage means 13, the execution service registering means 16, the reported location information managing means 11, user-defined area vector detecting means 14, a timer 18, the registered process executing means 12, a key pad 9 and a display 20.

The previous reported location information storage means 13 has facilities to store the reported location information detected by the reported location information detecting means 1 and immediately preceding the reported location information currently being received.

The execution service registering means 16 has facilities to register an execution service to be executed when a variation of reported location information corresponding to a user-defined area vector is detected. A user could arbitrary define a user-defined area vector.

The reported location information managing means 11 consists of user-defined area vector name registering means 15 and the storage means 17. The user-defined area vector name registering means 15 has facilities to register a user-defined area vector name corresponding to a designated variation of reported location information detected by the reported location information detecting means 1 and stored in the current reported location information storage means 4 and in the previous reported location information storage means 13. The storage means 17 has facilities to relate the user-defined area vector name registered by the user-defined area vector name registering means 15, to the designated variation of the reported location information, and to the execution service registered by the execution service registering means 16.

The user-defined area vector detecting means 14 refers to the current reported location information storage means 4 and the previous reported location information storage means 13 so as to detect the user-defined area vector name and the execution service that correspond to the designated variation of the reported location information stored in the storage means 17. For example, the user-defined area vector detecting means 14 detects the user-defined area vector name and the execution service that correspond to the designated variation from "Zone1" to "Zone2". If the user-defined area vector detecting means 14 detects "Zone2" and a time-out does not occur since before detecting "Zone1", the user-defined area vector detecting means 14 determines that it has detected a user-defined area vector. The user-defined area vector detecting means 14 detecting "Zone1" may detect other reported location information before it detects "Zone2".

When the user-defined area vector detecting means 14 detects the first reported location information "Zone1" constituting the designated variation of reported location information corresponding to the user-defined area vector name, the timer 18 starts counting. For example, the timer 18 is started when the first reported location information "Zone1" comprising the designated variation from "Zone1" to "Zone2" is detected.

The timer 18 also has facilities to notify the user-defined area vector detecting means 14 of a time-out when a time preset by the user of the mobile communication terminal has expired.

The registered process execution means 12 has facilities to execute an execution service corresponding to a user-defined area vector name when the user-defined area vector detecting means 14 detects the designated variation of the reported location information corresponding to the user-defined area vector name. For example, setting of call incoming refusal, setting of the answer phone facilities, setting of a call destination terminal, setting of screening are performed.

The key pad 19 implements the input means. The user-defined area name and the execution service registered by the user-defined area name registering means 5 and the execution service registering means 6, respectively, are input using the key pad 19.

The display 20 implements the display means and has facilities to display information stored in the storage means 17 and a screen image that prompts registration of an execution service.

A description will now be given of a process for executing an execution service corresponding to a predetermined user-defined area name, when the variation of the reported location information supplied from a base station agrees with the user-defined area name.

FIG. 19 shows a construction of a communication system according to the second embodiment of the present invention. This communication system consists of communication networks such as the PHS network 43, the fixed telephone network 44, and the corporate telephone network 45. Base stations are deployed in the PHS network 43 and the corporate telephone network 45. The base stations of the PHS network 43 cover areas ZoneA1 through ZoneA5. The base stations of the corporate telephone network 45 cover areas ZoneB1 and ZoneB2.

The personal number server 41 manages location information of a mobile communication terminal and offers communication service to the mobile communication terminal when a personal number specifying an individual is dialed. For example, the personal number server 41 offers services such as setting of call incoming refusal, and setting of answer phone facilities. An ISDN line connects each of the telephone networks 43, 44 and 45 with the personal number server 41. The personal number server 41 can distinguish between call originator number of the telephone network 43, 44 and 45. After a call originator is connected to the personal number server 41, the personal number server 41 can distinguish between call originators by the call originator dialing a PID which is assigned to the call originator.

In FIG. 19, those components that are identical to the components of FIG. 6 are designated by the same reference numerals and the description thereof is omitted.

At home (FIG. 19), the reported location information detecting means 1 of the PHS terminal detects ZoneA5. As shown in FIG. 9, the reported location information detecting means 1 of the PHS terminal detects all radio waves over the perch channels detectable by the PHS terminal. For example, as shown in FIG. 10, the reported location information detecting means 1 arranges the channels in the order of quality of reception of the radio wave, so as to generate a perch frequency sorted table. The reported location information detecting means 1 of the PHS terminal retrieves the reported location information in a frequency band in which a predetermined reception level is exceeded, and stores the retrieved reported location information in the current reported location information storage means 4. A similar process for storing the reported location information is also performed in a portable telephone set.

Figure 20:
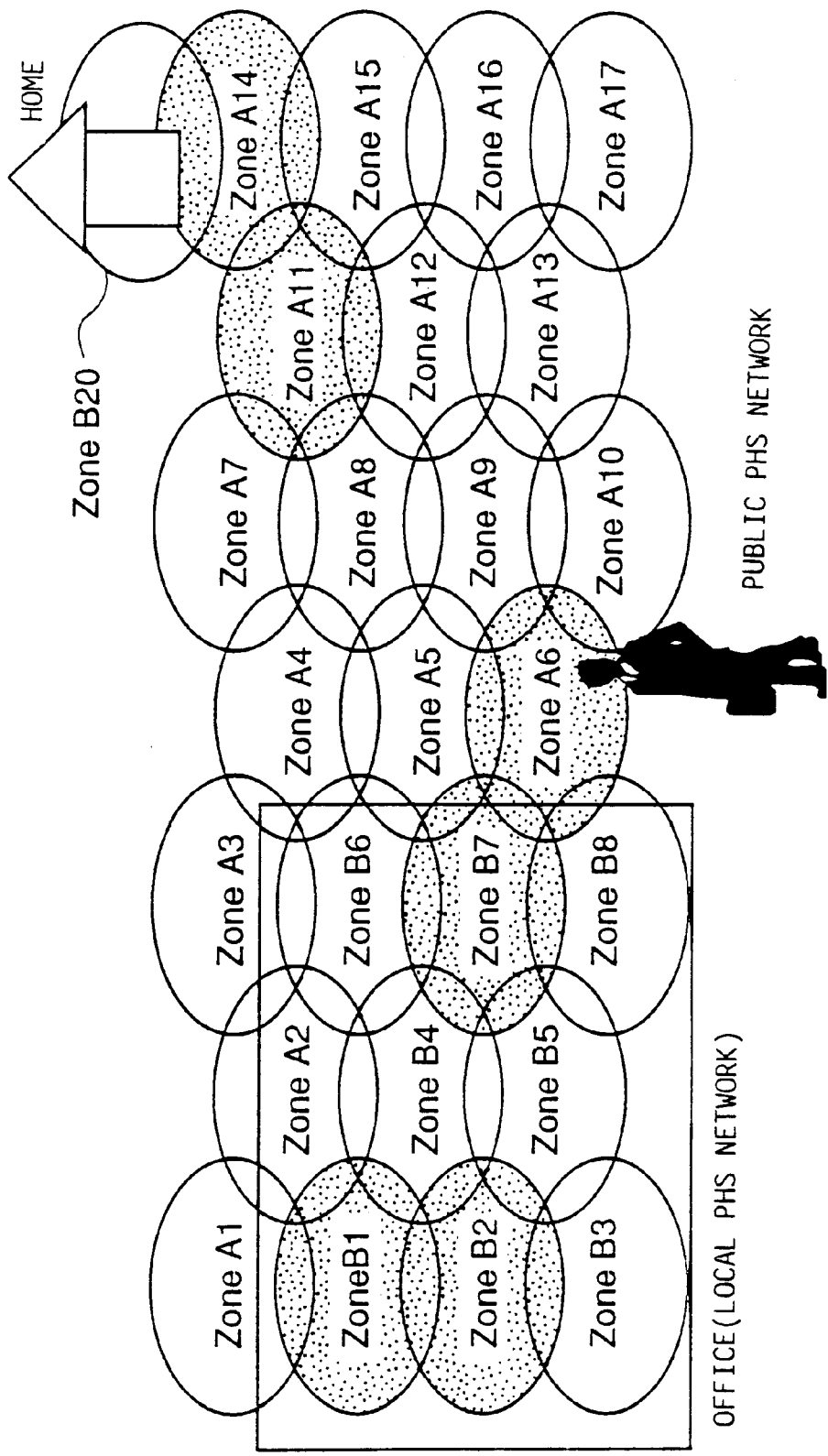
FIG. 20 shows an example of registration of a user-defined area vector name.

Referring to FIG. 20, a description will now be given of a process for registering a user-defined area vector name according to the flow chart of FIG. 26, wherein the user-defined area vector name is registered in correspondence with a designated variation of the reported location information stored in the current reported location information storage means 4 and the previous reported location information storage means 13. A process for registering an area vector name "home" in the PHS terminal will be described as an example.

The owner of the PHS terminal determines whether the registration of the user-defined area vector at home is new, before registering a user-defined area vector name using the key pad 9 (S61).

If the registration of the area vector name "home" in the PHS terminal is new (S61, YES), the reported location determines whether to relate a user-defined area vector name (for example, "home") to a combination of the current reported location information (for example, "ZoneA11") stored in the current reported location information storage means 4 and the next reported location information detected by the reported location detecting means 1 (for example, "ZoneA14"), or to relate the user-defined area vector name "home" to a combination of the previous reported location information (for example, "ZoneA11") and the current reported location information (for example, "ZoneA14") (S62).

When the current reported location information "ZoneA11" and the next reported location information "ZoneA14" are combined (S62, combination with the next reported location information), the user of the PHS terminal inputs, for example, "home" as a user-defined area vector name, using the key pad 9 (S63). The reported location information managing means 11 reads out the current reported location information "ZoneA11" from the current reported location information storage means 4 and waits for the reported location information "ZoneA14" detected subsequently by the reported location information detecting means 1 (S64). The reported location information managing means 11 terminates the registration of a user-defined area vector name when it fails to detect the reported location information "ZoneA14" within a predetermined period of time set by the user of the PHS terminal. When the reported location information "ZoneA14" is detected within the period of time preset by the user of the PHS terminal, the reported location information managing means 11 searches the storage means 17 for a user-defined area vector name corresponding to the current reported location information "ZoneA11" and the subsequently detected reported location information "ZoneA14" (S65). When it is determined that the user-defined area vector name corresponding to the reported location information "ZoneA11" and "ZoneA14" is not found as a result of the search by the reported location information managing means 11 (S66, NO), the user-defined area vector name registering means 15 relates the user-defined area vector name "home" to a designated variation of the reported location information from "ZoneA11" to "ZoneA14", and registers the relation in the storage means 17 (S67). When it is determined that the user-defined area vector name corresponding to the reported location information "ZoneA11" and "ZoneA14" is found as a result of the search by the reported location information managing means 11, (S66, YES), the reported location information managing means 11 reads out the user-defined area vector name corresponding to the reported location information from the storage means 17, and displays the same on the display 20 When the user-defined area vector name displayed on the display 20 is to be changed (S68, change), the user of the PHS terminal inputs "home" as a user-defined area vector name using the key pad 19 (S69). The user-defined area vector name registering means 15 registers, in the storage means 17, the user-defined area vector name "home" and the designated variation of the reported location information from "ZoneA11" to "ZoneA14" (S67). When the displayed user-defined area name is to be retained (S68, retain), the user of the PHS terminal does nothing, thus terminating the process. When the displayed user-defined area vector name is not needed (S68, delete), the user of the PHS terminal uses the key pad 19 to provide an input instructing deletion of data. The reported location information managing means 11 deletes the user-defined area vector name corresponding to the designated variation, from "ZoneA11" to "ZoneA14", of the reported location information stored in the storage means 17 (S70).

When the current reported location information "ZoneA14" and the immediately preceding reported location information "ZoneA11" are combined so as to be related to the user-defined area vector name "home" (S62, combined with the previous reported location information), the reported location information managing means 11 reads out the current reported location information "ZoneA14" from the current reported location information storage means 4 and reads out the immediately preceding reported location information "ZoneA11" from the previous reported location information storage means 13. The reported location information managing means 11 searches the storage means 17 for a user-defined area vector name corresponding to the current reported location information "ZoneA14" and the immediately preceding reported location information "ZoneA11". When it is determined that the user-defined area vector name corresponding to the designated variation, from "ZoneA11" to "ZoneA14", of the reported location information as a result of the search by the reported location information managing means 11, the user-defined area vector name registering means 15 relates the user-defined area vector name "home" to the designated variation, from "ZoneA11" to "ZoneA14", of the reported location information, and registers the relation in the storage means 17 (S71 does it) (S67). When it is determined as a result of the search by the reported location information managing means 11 that the user-defined area vector name corresponding to the variation, from "ZoneA11" to "ZoneA14", of the reported location information (S71, YES), the reported location information managing means 11 reads out a user-defined area vector name corresponding to the reported location information from the storage means 17 and displays the same on the display 20. When the user-defined area vector name displayed on the display 20 is to be changed (S68, change), the user of the PHS terminal inputs "home" as a user-defined area vector name using the key pad 19 (S69). The user-defined area vector name registering means 15 registers, in the storage means 17, the user-defined area vector name "home" and the designated variation of the reported location information from "ZoneA11" to "ZoneA14" (S67). When the displayed user-defined area name is to be retained (S68, retain), the user of the PHS terminal does nothing, thus terminating the process. When the displayed user-defined area vector name is not needed (S68, delete), the user of the PHS terminal uses the key pad 19 to provide an input instructing deletion of data. The reported location information managing means 11 deletes the user-defined area vector name corresponding to the designated variation, from "ZoneA11" to "ZoneA14", of the reported location information stored in the storage means 17 (S70).

When a process for registering a user-defined area vector name "home" in the PHS terminal is not new (S61, NO), the user of the PHS terminal inputs the user-defined area vector name "home" using the key pad 9 (S72). The reported location information managing means 11 searches the storage means 17 for the user-defined area vector name "home" (S73), reads out the user-defined area name from the storage means 17 and displays the user-defined area vector name on the display 10. When the displayed user-defined area name is to be changed, the user of the PHS terminal uses the key pad 19 to input "home" as a user-defined area vector name (S74), so that the user-defined area vector name registering means 15 relates the user-defined area vector name "home" to the designated variation, from "ZoneA11" to "ZoneA14", of the reported location information and registers the relation in the storage means 17 (S67).

The above description for the flow of operation for registering the designated change, from ZoneA11 to ZoneA14, of the reported location information detected by the PHS terminal, and also registering the user-defined area vector name "home" also applies to the corresponding flow of operation performed in the portable telephone set.

Figure 26:
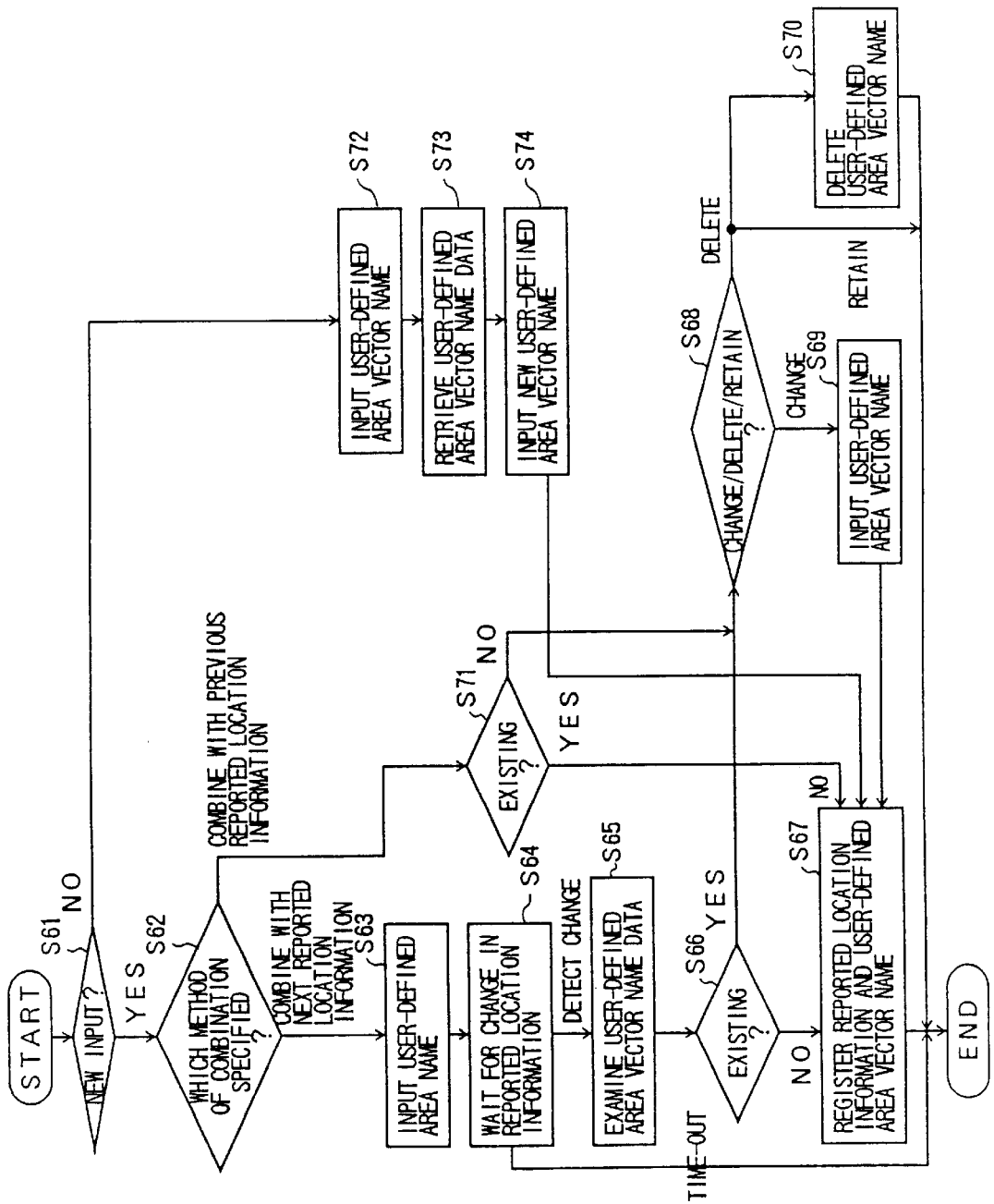
FIG. 26 is a flowchart for a process for registering a user-defined area vector name.

Referring to FIGS. 20 and 21, the user of the PHS terminal follows the process of FIG. 26, such that the user-defined area vector name "home" is related to the designated variation from "ZoneA11" to "ZoneA14" of the reported location information, the user-defined area vector name "out" is related to the designated variation from "ZoneA14" to "ZoneA11" of the reported location information, the user-defined area vector name "office (in)" is related to the designated variation from "ZoneA6" to "ZoneB7" of the reported location information, the user-defined area vector name "office (out)" is related to the designated variation from "ZoneB7" to "ZoneA6" of the reported location information, the user-defined area vector name "meeting room (in)" is related to the designated variation from "ZoneB2" to "ZoneB1" of the reported location information, and the user-defined area vector name "office (out)" is related to the designated variation from ZoneB1 to ZoneB2 of the reported location information. The reported location information managing means 11 relates each designated variation of the reported location information to the respective user-defined area vector name, and registers the relation in the storage means 17.

After the registration of the user-defined area vector name is completed, the user of the PHS terminal executes registration of execution service as shown in FIG. 21, for example.

Figure 24:
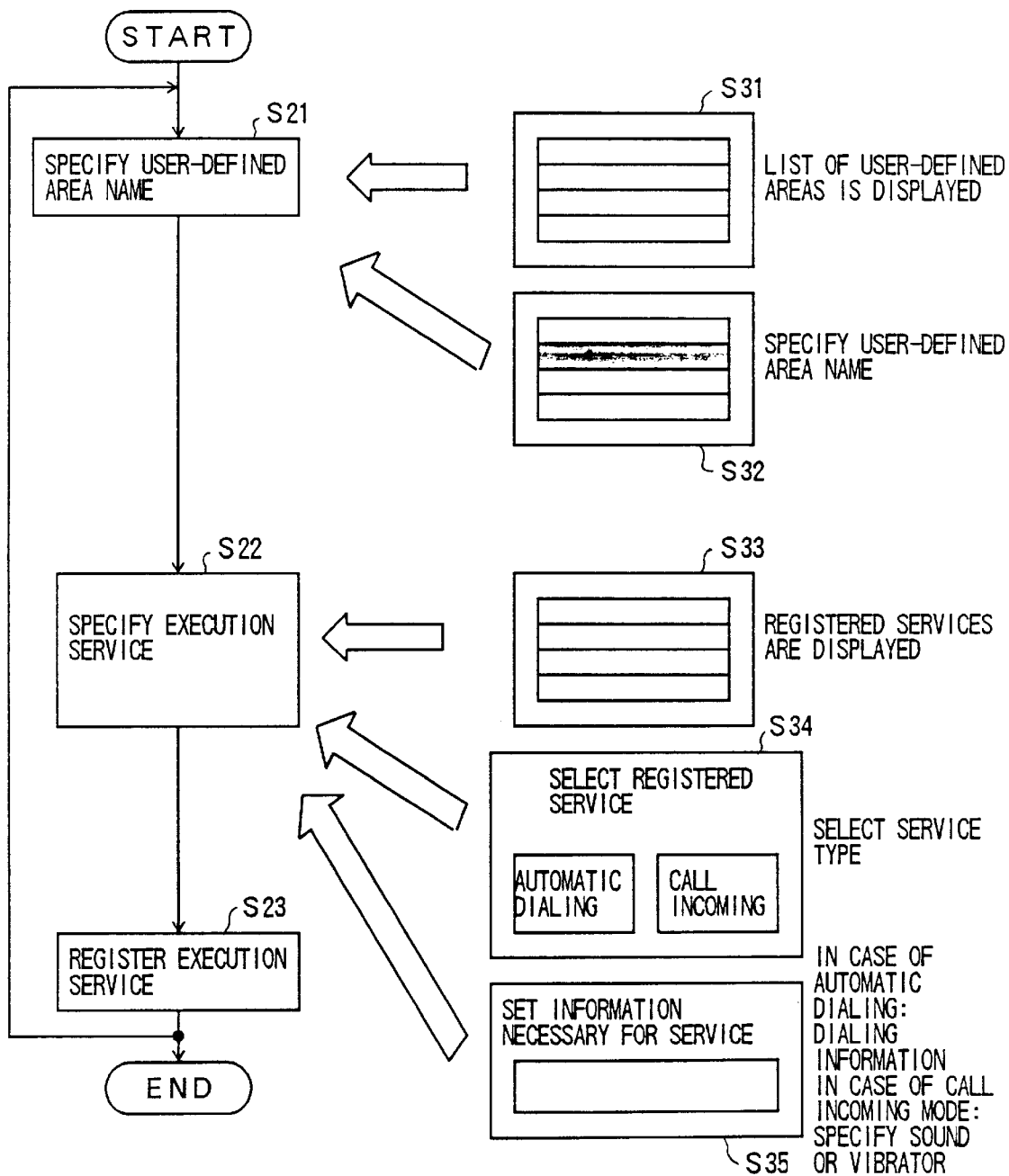
FIG. 24 shows an example of registration of an execution service.

Registration of the execution service in the storage means 17 in relation to the designated variation of the reported location information and the user-defined area vector name registered in the storage means 17 is similar to the flow chart shown in FIG. 24.

The user of the PHS terminal uses the key pad 19 to perform an operation for registering an execution service.

The execution service registering means 16 reads out the user-defined area vector name "home", "out", "office(in)", "office(out)", "meeting room (in)", and "meeting room (out)" from the storage means 17, and displays the list on the display 20 (S31). For example, the user of the PHS terminal selects, using the key pad 19, "home" as the user-defined area vector name with which the user wants an execution service to be registered (S21, S32). When the user-defined area vector name "home" is selected, the execution service registering means 16 displays a list of registered execution services on the display 20, whereupon the user of the PHS terminal uses the key pad 19 to select "setting of the answer phone facilities" as an execution service (S33). When execution service is selected, the execution service registering means 16 displays a screen image prompting selection of a type of execution service on the display 20. When a service, executed by automatically dialing the personal number server 41 when the reported location information corresponding to the user-defined area vector name is detected, is registered, the user of the PHS terminal selects "auto-dial". For example, "auto-dial" is selected when setting of a call destination terminal, setting of screening, setting of the answer phone facilities, or setting of call incoming refusal is registered. When setting of a call incoming alert mode, which is an execution service automatically preset in the PHS terminal is registered, the user selects "call incoming mode". Since it is assumed that registration of setting of the answer phone facilities is executed as an execution service, the user of the PHS terminal selects "auto-dial" (S34). When the type of execution service is selected, the execution service registering means 16 displays a screen image on the display 20 prompting setting of information necessary for the execution service. Since it is assumed that the execution service is registered for the user-defined area vector name "home", the user of the PHS terminal inputs dial information for "cancellation" as the information necessary for setting the answer phone facilities (S22, S35). The execution service registering means 16 relates the answer phone facilities setting "cancellation" provided in the operation described above, to the designated variation from "ZoneA11" to "ZoneA14" of the reported location information and to the user-defined area vector name "home", and registers the relation in the storage means 17 (S23).

After the registration of the setting "cancellation" of the answer phone facilities is completed, the user of the PHS terminal uses the key pad 19 to perform an operation for registering an execution service once again. The execution service registering means 16 reads out the user-defined area vector name "home", "out", "office(in)", "office(out)", "meeting room (in)", and "meeting room (out)" from the storage means 17, and displays the list on the display 20 (S31). The user of the PHS terminal selects the user-defined area vector name "home" with which the user wants an execution service to be registered, using the key pad 19 (S21, S32).

When the user-defined area vector name "home" is selected, the execution service registering means 16 displays a list of registered execution services on the display 20, whereupon the user of the PHS terminal uses the key pad 19 to select "setting of a call destination terminal" as an execution service (S33). When the execution service is selected, the execution service registering means 16 displays a screen image prompting selection of a type of execution service on the display 20. Since the registration of the setting of a call destination terminal is executed as an execution service, the user of the PHS terminal selects "auto-dial" (S34). When the type of execution service is selected, the execution service registering means 16 displays a screen image on the display 20, prompting the setting of information necessary for the execution service. The user of the PHS terminal inputs dial information for "domestic telephone set" as the information necessary for the setting of a call destination terminal (S22, S35).

The execution service registering means 16 relates the setting of "domestic telephone set" as a call destination terminal, to the designated variation from "ZoneA11" to "ZoneA14" of the reported location information and user-defined area vector name "home", and it is registered in the storage means 17 (S23).

After the registration of the execution service is completed for the user-defined area vector name "home", the user of the PHS terminal follows the process of FIG. 24 so as to register execution services for the user-defined area vector names "out", "office (in)", "office (out)", "meeting room (in)", and "meeting room (out)", as shown in FIG. 21.

Figure 27:
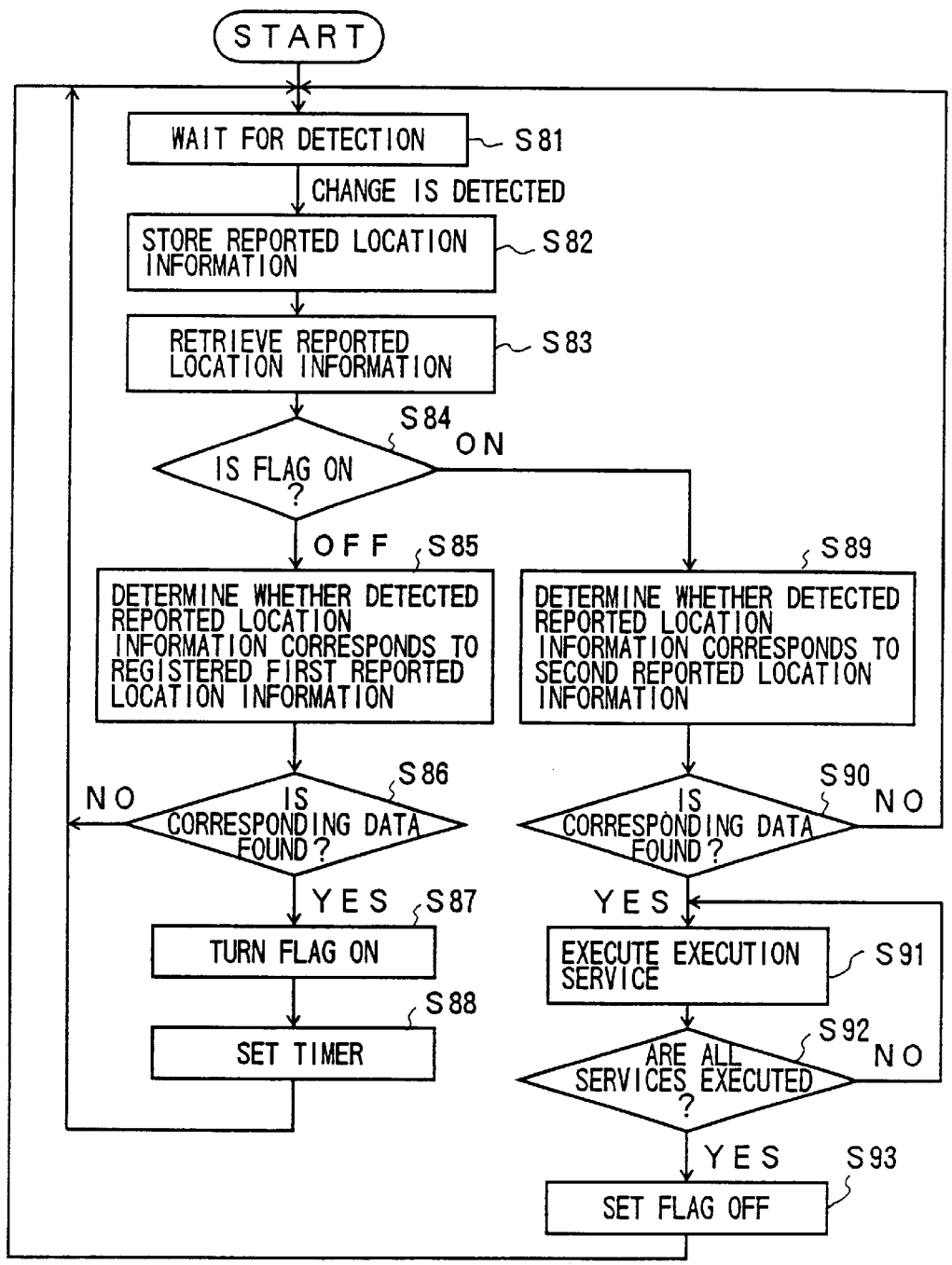
FIG. 27 is a flowchart for automatic execution of an execution service.

When the registration of the user-defined area vector name and the execution service is completed, and when the reported location information detecting means 1 of the PHS terminal detects the designated variation from "ZoneA11" to "ZoneA14" of the reported location information, the designated variation from "ZoneA14" to "ZoneA11", the designated variation from "ZoneA6" to "ZoneB7", the designated variation from ZoneB7 to "ZoneA6", the designated variation from "ZoneB2" to "ZoneB1", the designated variation from ZoneB1 to ZoneB2 corresponding to the user-defined area vector name "home", "out", "office (in)", "office (out)", "meeting room (in)", and "meeting room (out)", respectively, from a base station, the registered process execution means 12 automatically executes the execution service corresponding to the user-defined area vector name. A description will be given of the above process with reference to FIG. 27 showing a flow chart for automatically executing an execution service. For example, in the case of a designated variation from "ZoneA11" to "ZoneA14" of the reported location information, "ZoneA11" is defined as first reported location information, and "ZoneA14" is defined as second reported location information.

The registered process execution means 12 of the PHS terminal waits for the detection of reported location information from a base station by the reported location information detecting means 1 (S81). For example, when the reported location information detecting means 1 detects the reported location information "ZoneA11", the current reported location information storage means 4 stores the current reported location information (for example, ZoneA12) in the previous reported location information storage means 13, and the reported location information detecting means 1 stores the reported location information "ZoneA11" in the current reported location information storage means 4 (S82). The user-defined area vector detecting means 14 retrieves the reported location information "ZoneA11" from the current reported location information storage means 4 (S83) and examines a flag indicating whether the immediately preceding reported location information "ZoneA12" agrees with the first reported location information corresponding to any of the user-defined area vector names "home", "out", "office (in)", "office (out)", "meeting room (in)" and "meeting room (out)" (S84). This flag is set to ON in agreement and OFF in disagreement.

As a result of the examination by the user-defined area vector detecting means 14, it is found that the reported location information "ZoneA12" does not agree with the first reported location information corresponding to the registered user-defined area vector name (S84, OFF), the flag is set to OFF. The user-defined area vector detecting means 14 determines whether the reported location information "ZoneA11" corresponds to the registered first reported location information (S85). If the corresponding data is found (S86, YES), the registered process execution means 12 waits for the next reported location information that the reported location information detecting means 1 detects. Since the reported location information "ZoneA1" agrees with the first reported location information "ZoneA11" constituting the designated variation from "ZoneA11" to "ZoneA14" of the reported location information corresponding to the user-defined area vector name "home" (S86, NO), the user-defined area vector detecting means 14 sets the flag ON (S87) and start the timer 18. A predetermined period of time is set in the timer 18.

The registered process execution means 12 of the PHS terminal again waits for the detection of the reported location information from a base station by the reported location information detecting means 1 (S81). For example, when the reported location information detecting means 1 detects reported location information "ZoneA14", current reported location information storage means 4 stores current reported location information "ZoneA11" in the previous reported location information storage means 13, and the reported location information detecting means 1 stores reported location information "ZoneA14" in current reported location information storage means 4 (S82). The user-defined area vector detecting means 14 retrieves the reported location information "ZoneA14" from the current reported location information storage means 4 (S83) and examines a flag indicating whether the immediately preceding reported location information "ZoneA11" agrees with the first reported location information corresponding to any of the user-defined area vector names "home", "out", "office (in)", "office (out)", "meeting room (in)" and "meeting room (out)" (S84).

As a result of the examination by the user-defined area vector detecting means 14, it is found that the reported location information "ZoneA11" agrees with the first reported location information corresponding to the registered user-defined area vector name (S84, ON), the flag is set to OFF. User-defined area vector detecting means 14 determines whether the reported location information "ZoneA14" corresponds to the registered second reported location information (S89). If the corresponding data is not found (S90, NO), the registered process execution means 12 waits for the next reported location information that the reported location information detecting means 1 detects. Since the reported location information "ZoneA14" agrees with the second reported location information "ZoneA14" constituting the designated variation from ZoneA11 to "ZoneA14" of the reported location information corresponding to the user-defined area vector name "home" (S90, YES), the user-defined area vector detecting means 14 allows the registered process execution means 12 to execute an execution service corresponding to the designated variation" from "ZoneA11" to "ZoneA14". The registered process execution means 12 reads out the execution service corresponding to the designated variation from "ZoneA11" to "ZoneA14" of the reported location information, from the storage means 17. For example, the registered process execution means 12 reads out the execution service "setting of the answer phone facilities". The registered process execution means 12 sequentially auto-dials a personal number service number, a PID of a call originator, a service number indicating the answer phone facilities, a service number indicating cancellation, so as to cancel the answer phone facilities (S91).

In step 91 of the second embodiment, the registered process execution means 12 auto-dials the personal number server 41, so that the personal number server 41 sets the answer facilities for the PHS terminal. When the PHS terminal is provided with answer phone setting facilities, the execution service "setting of the answer phone facilities" corresponding to the newly detected reported location information is read out from the storage means 17, so that the automatic setting of the answer phone facilities is executed within the PHS terminal.

The registered process execution means 12 examines the storage means 17 to determine whether there are other execution services corresponding to the designated variation from "ZoneA11" to "ZoneA14" (S92).

The storage means 17 stores another execution service corresponding to the designated variation from "ZoneA11" to "ZoneA14". More specifically, the storage means 17 stores the corresponding execution service "setting of a call destination terminal" (S92, NO). Therefore, the registered process execution means 12 reads out the execution service "setting of a call destination terminal" from the storage means 17. The registered process execution means 12 sequentially auto-dials a personal number service number, a PID of a call originator, a service number indicating setting of a call destination terminal, and a service number indicating a domestic telephone set, so as to set the domestic telephone set as a call destination terminal (S91).

The registered process execution means 12 examines the storage means 17 to determine whether there are other execution services corresponding to the designated variation from ZoneA11 to ZoneA14 (S92). Since there are no other corresponding execution services (S92, YES), the registered process execution means 12 sets the flag to OFF (S93) and waits for the detection of reported location information from a base station by the reported location information detecting means 1.

Automatic execution of the execution service based on the flow chart of FIG. 27 as described above is also performed for the user-defined area vector names other than the user-defined area vector name "home". More specifically, the execution service is executed for the user-defined area vector names "out", "office (in)", "office (out)", "meeting room (in)", and "meeting room (out)". Automatic execution of the execution services other than the "setting of the answer phone facilities" and the "setting of a call destination terminal" is performed as described below. In setting screening, the registered process execution means 12 sequentially auto-dials a personal number service number, a PID of a call originator, a service number indicating setting of screening, and a service number indicating a parameter (work, private). In setting call incoming refusal, the registered process execution means 12 sequentially auto-dials a personal number service number, a PID of a call originator, a service number indicating setting of call incoming refusal, and a service number indicating a parameter (setting, cancellation). In setting a call incoming alert mode, either the sound or the vibrator is specified in the PHS terminal. When The PHS terminal is provided with facilities to provide setting of screening or facilities to provide setting of call incoming refusal, the registered process execution means 12 reads out the execution service "screening setting" or "setting of call incoming refusal" corresponding to the newly detected reported location information from the storage means 17, and performs automatic execution for automatically setting screening or automatically setting call incoming refusal in the PHS terminal.

An execution service may be set not to be executed automatically even if the information position detecting means 1 detects the designated variation of the reported location information corresponding to the user-defined area vector. In this case, execution of the execution service may be started after giving a notice of confirmation (sound or display) with the user of the PHS terminal.

Referring back to FIG. 6, the description given above, namely, the description regarding automatic execution of an execution service corresponding to a user-defined area vector name performed when the reported location information detecting means 1 of the PHS terminal detects the designated variation of the reported location information corresponding to the user-defined area vector name "home", "out", "office (in)", "office (out)", "meeting room (in)", or "meeting room (out)" from a base station, also applies to the portable telephone set.

Figure 3:
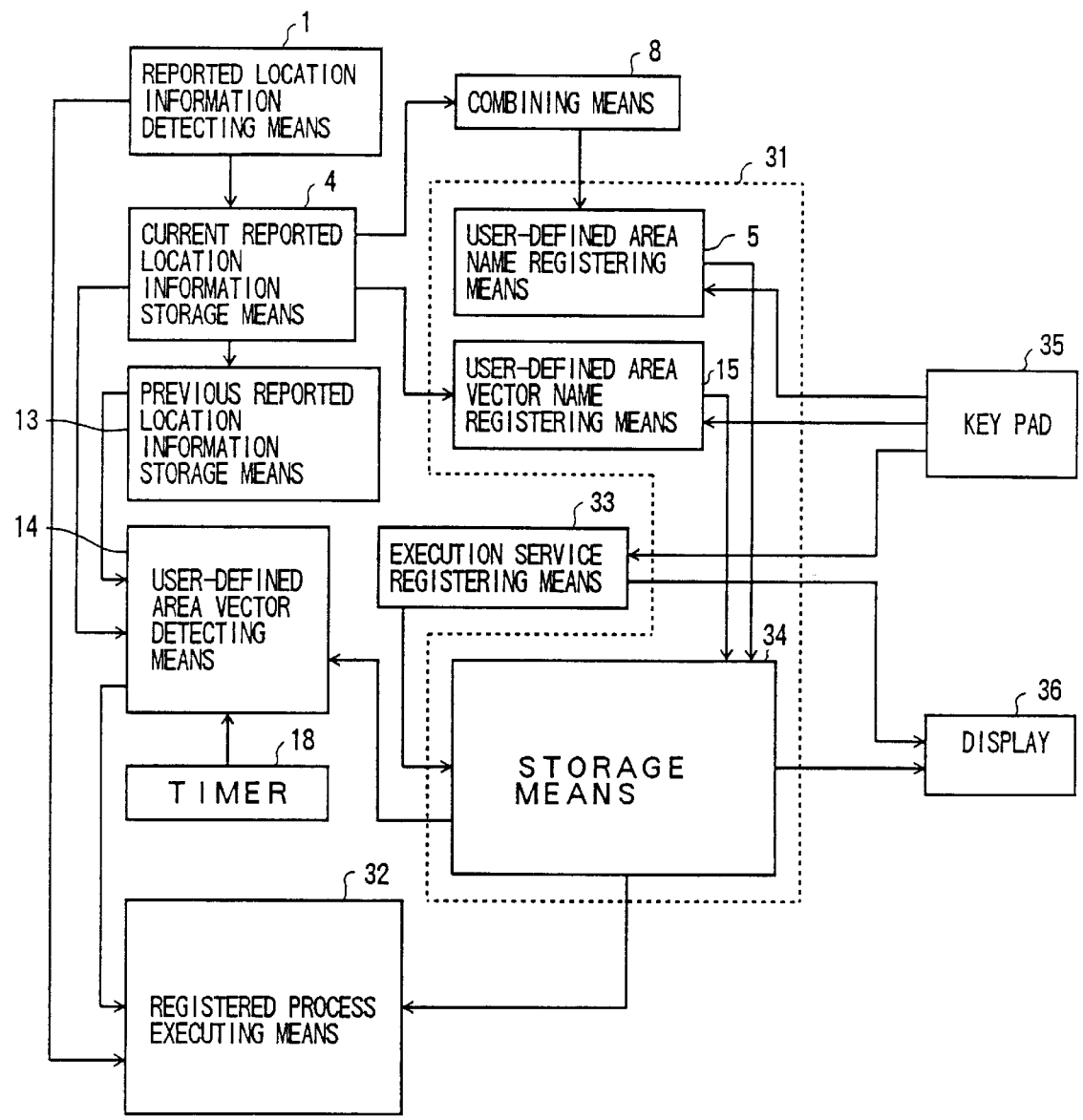
FIG. 3 shows a principle and construction of a mobile communication terminal according to a third embodiment of the present invention.

FIG. 3 shows a principle and construction of a mobile communication terminal according to a third embodiment of the present invention. In the third embodiment, when the reported location information or a variation of the reported location information supplied from a base station agrees with the information managed by a mobile communication terminal, a registered process corresponding to the matching information is performed.

Means to implement execution of the execution service according to the third embodiment is the same as the corresponding means in the hardware construction according to the first embodiment shown in FIGS. 4 and 5.

Referring to FIG. 3, means to execute an execution service of a mobile communication terminal consist of the reported location information detecting means 1, the current reported location information storage means 4, the previous reported location information storage means 13, the combination means 8, execution service registering means 33, reported location information managing means 31, the user-defined area vector detecting means 14, the timer 18, registered process executing means 32, a key pad 35 and a display 36.

The execution service registering means 33 has facilities to register an execution service to be executed when the reported location information corresponding to a user-defined area name or a user-defined area vector is detected. A user could arbitrary define a use-defined area name and a user-defined area vector.

The reported location information managing means 31 consists of the user-defined area name registering means 5, the user-defined area vector name registering means 15 and the storage means 17. The user-defined area name registering means 5 has facilities to register a user-defined area name corresponding to the reported location information detected by the reported location information detecting means 1 and stored in the current reported location information storage means 4, or corresponding to a Boolean operation result of the reported location information determined by the combination means 8. The user-defined area vector name registering means 15 has facilities to register a user-defined area vector name corresponding to a designated variation of reported location information detected by the reported location information detecting means 1 and stored in the current reported location information storage means 4 and in the previous reported location information storage means 13. The storage means 34 has facilities to relate the user-defined area vector name registered by the user-defined area vector name registering means 5, to the reported location information, and to the execution service registered by the execution service registering means 33. The storage means 34 also have facilities to relate the relate the user-defined area vector name registered by the user-defined area vector name registering means 15, to the designated variation of the reported location information, and to the execution service registered by the execution service registering means 33.

The registered process executing means 32 has facilities to execute an execution service corresponding to the user-defined area when the reported location information detecting means 1 detects the reported location information corresponding to the user-defined area name. For example, the registered process executing means 3 has facilities to set a call incoming alert mode, call incoming refusal, the answer phone facilities, a call destination terminal, and screening facilities. The registered process execution means 32 also has facilities to execute an execution service corresponding to a user-defined area vector name when the user-defined area vector detecting means 14 detects the designated variation of the reported location information corresponding to the user-defined area vector name. For example, setting of call incoming refusal, setting of the answer phone facilities, setting of a call destination terminal, setting of screening are performed.

The key pad 35 implements the input means. The user-defined area name, the user-defined area vector name and the execution service registered by the user-defined area name registering means 5, the user-defined area vector name registering means 15, and the execution service registering means 16, respectively, are input using the key pad 35.

The display 20 implements the display means and has facilities to display information stored in the storage means 34 and a screen image that prompts registration of an execution service.

In FIG. 3, those components that are identical to the corresponding components of FIG. 2 are designated by the same reference numerals, and the description thereof is omitted. In the third embodiment, the same construction of the communication system as used in the second embodiment described with reference to FIG. 19 is used, so that the description thereof is omitted.

A description will now be given of a process according to the third embodiment, whereby a mobile communication terminal relates a user-defined area name to the reported location information or a variation of the reported location information supplied by a base station, and, when a variation of the user-defined area names agrees with a user-defined area vector name, an execution service corresponding to the user-defined area vector name is executed.

Figure 28:
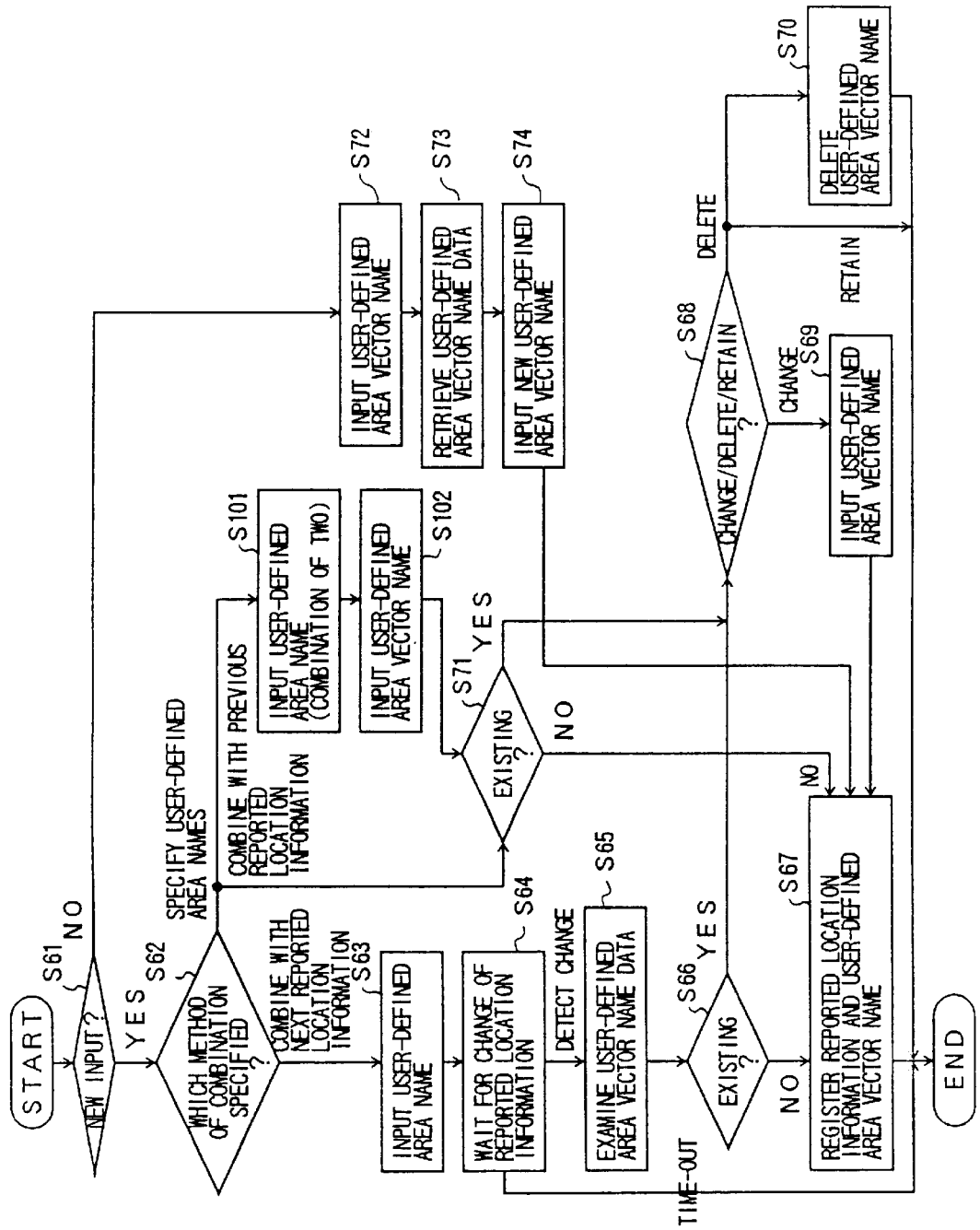
FIG. 28 is a flowchart for a process for registering a user-defined area vector name.

Referring to FIGS. 20 and 28, a user-defined area name is registered for the reported location information detected by the reported location information detecting means 1, and a user-defined area vector name is registered for a designated variation of the user-defined area names. For example, a user-defined area name "area A" is registered for the reported location information "(ZoneA11) and (ZoneA15)", a user-defined area name "area B" is registered for the reported location information "(ZoneA14) and (ZoneB20)", and an area vector "home" is registered for the designated variation from "area A" to "area B". Since the registration of the user-defined area names "area A" and "area B" is performed according to the flow chart shown in FIG. 23, the description thereof is omitted.

After registering the user-defined area names "area A" and "area B" according to the flow chart of FIG. 23, the user of the PHS terminal determines whether the registration of the user-defined area vector for "home" is new, before operating the key pad 35 to register the user-defined area vector name (S61).

When the process for registering the user-defined area vector name for "home" in the PHS terminal is new (S61, YES) the reported location information managing means 11 determines whether a user-defined area vector name is registered in correspondence with a combination of the current reported location information stored in the current reported location information storage means 4 and the reported location information subsequently detected by the reported location information detecting means 1, or a user-defined area vector name is registered in correspondence with a combination of the current reported location information and the immediately preceding reported location information, or a user-defined area vector name is registered in correspondence with a designated variation of user-defined area names (S62).

It is assumed that the process for registering a user-defined area vector name for the designated variation of user-defined area names is selected (S62, specify user-defined area names). In the flow chart of FIG. 28, those steps identical to the corresponding steps of FIG. 26 are designated by the same reference numerals, and the description thereof is omitted.

The user of the PHS terminal inputs a designated variation from "area A" to "area B" of the user-defined area names, using the key pad 35 (S101) and subsequently inputs "home" as a user-defined area vector name (S102). The reported location information managing means 31 searches the storage means 34 to determine whether the designated variation from "area A" to "area B" of the user-defined area names is stored therein (S71).

When it is determined that the designated variation is not stored as a result of the search by the reported location information managing means 31 by the storage means 34 (S71, NO), the user-defined area vector name registering means 15 relates the user-defined area vector name "home" to the designated variation from "area A" to "area B" of the user-defined area names and registers the relation in the storage means 34 (S67).

When it is determined that the designated variation is stored in the storage means 34 as a result of the search by the reported location information managing means 11 (S70, YES), the reported location information managing means 31 reads out the user-defined area vector name corresponding to the designated variation from "area A" to "area B" of the user-defined area names from the storage means 34, and displays the same on the display 36. When the displayed user-defined area vector name is to be changed (S68, change), the user of the PHS terminal inputs "home" as a user-defined area vector name from the key pad 35 (S69), so that the user-defined area vector name registering means 15 registers, in the storage means 34, the user-defined area vector name "home" and the designated variation from "area A" to "area B" of the user-defined area names (S67). When the displayed user-defined area vector name is to be retained (S68, retain), the user of the PHS terminal does nothing, thus terminating the process. When the displayed user-defined area vector name is not needed (S68, delete), the user of the PHS terminal provides an input instructing deletion of data using the key pad 35. The reported location information managing means 31 deletes the user-defined area vector name corresponding to the designated variation from "area A" to "area B" of the user-defined area names stored in the storage means 34 (S69).

After the registration of the user-defined area vector name "home" is completed, the user of the PHS terminal executes registration of an execution service as shown in FIG. 22.

The process for registering an execution service in correspondence with the designated variation of the user-defined area names and the user-defined vector name registered in the storage means 34 is similar to the process shown in FIG. 24, so that the description thereof is omitted.

Figure 29:
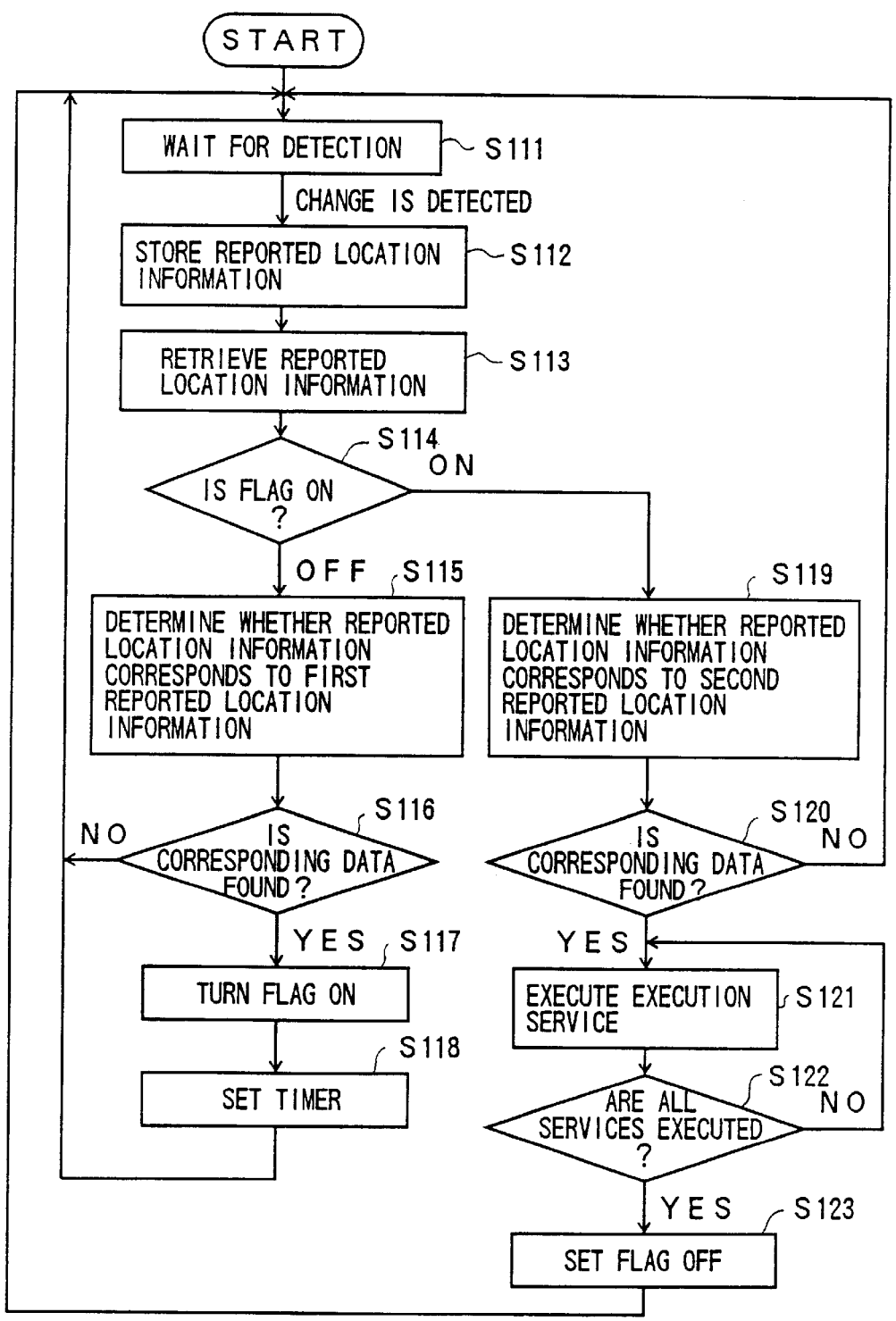
FIG. 29 is a flowchart for a automatic execution of an execution service.

When the registration of the user-defined area vector name and the execution service is completed, and when the user-defined area vector detecting means 14 of the PHS terminal detects, from a base station, a designated variation from "area A" to "area B" of the user-defined area names corresponding to the user-defined area vector name "home", the registered process execution means 32 automatically executes an execution service corresponding to the user-defined area vector name. The automatic execution of the execution service will now be described with reference to FIG. 29. When the designated variation of the user-defined area names is a variation from "area A" to "area B", "area A" is defined as the first user-defined area name, and "area B" is defined as the second user-defined area name.

The registered process execution means 32 of PHS terminal waits for the detection of reported location information from a base station by the reported location information detecting means 1 (S111). When the reported location information detecting means 1 detects the reported location information "(ZoneA11) and (ZoneA15)", for example, the stores "ZoneA12" in the previous reported location information storage means 13 as current reported location information, the current reported location information storage means 4 stores (ZoneA12) in the previous reported location information storage means 13 and the reported location information detecting means 1 stores the reported location information "(ZoneA11) and (ZoneA15)" in the current reported location information storage means 4 (S112). The user-defined area vector detecting means 14 retrieves the reported location information "(ZoneA11) and (ZoneA15)" from the current reported location information storage means 4 (S113) and retrieves "ZoneA12" from the previous reported location information storage means 13. The user-defined area vector detecting means 14 examines a flag indicating whether the reported location information corresponds to the first user-defined area name corresponding to the user-defined area vector name (S114). The flag is set to ON when the reported location information corresponds to the first user-defined area name "area A" corresponding to the user-defined area vector name "home", and is set to OFF when no correspondence exists.

It is determined, as a result of the examination by the user-defined area vector detecting means 14, that the reported location information "ZoneA12" does not correspond to the first user-defined area name corresponding to the user-defined area vector name (S114, OFF), so that user-defined area vector detecting means 14 determines whether the reported location information "(ZoneA11) and (ZoneA15)" correspond to the first user-defined area name (S115). When a correspondence is not found (S116 NO), the registered process execution means 32 waits for the next reported location information detected by the reported location information detecting means 1. Since the reported location information "(ZoneA11) and (ZoneA15)" corresponds to the first user-defined area name "area A" constituting the designated variation from "area A" to "area B" of the user-defined area names corresponding to the user-defined area vector name "home" (S116, NO), the user-defined area vector detecting means 14 (S117) sets the flag to ON and starts the timer 18 (S118). A predetermined period of time is set in the timer 18.

The registered process execution means 32 of the PHS terminal waits for the detection of the reported location information from a base station by the reported location information detecting means 1 once again (S111). When the reported location information detecting means 1 detects the reported location information "(ZoneA14) and (ZoneB20)", the current reported location information storage means 4 stores the current reported location information "(ZoneA11) and (ZoneA15)" in the previous reported location information storage means 13, and the reported location information detecting means 1 stores the reported location information "(ZoneA14) and (ZoneB20)" in the current reported location information storage means 4 (S112). The user-defined area vector detecting means 14 retrieves the reported location information "(ZoneA14) and (ZoneB20)" from the current reported location information storage means 4 (S113), and retrieves the reported location information "(ZoneA11) and (ZoneA15)" from the previous reported location information storage means 13. The user-defined area vector detecting means 14 examines a flag indicating whether the immediately preceding reported location information corresponds to the first user-defined area name corresponding to the user-defined area vector name "home" (S114).

Since it is determined, as a result of the examination by the user-defined area vector detecting means 14, that the reported location information "(ZoneA11) and (ZoneA15)" corresponds to the first user-defined area name corresponding to the registered user-defined area vector name (S114, ON), the user-defined area vector detecting means 14 determines whether the reported location information "(ZoneA14) and (ZoneB20)" corresponds to the registered second user-defined area name (S119). When a correspondence does not exists (S120, NO), the registered process execution means 12 waits for the next reported location information detected by the reported location information detecting means 1. Since the reported location information "(ZoneA14) and (ZoneB20)" corresponds to the second user-defined area name "area B" constituting the designated variation from "area A" to "area B" of user-defined area names corresponding to the user-defined area vector name "home" (S120, YES), the user-defined area vector detecting means 14 allows the registered process execution means 12 to execute an execution service corresponding to the designated variation from "area A" to "area B" of the user-defined area names. The registered process execution means 12 reads out an execution service corresponding to the designated variation from "area A" to "area B" of the user-defined area names from the storage means 17. For example, the registered process execution means 12, reads out the execution service "setting of the answer phone facilities". The registered process execution means 12 sequentially auto-dials a personal number service number, a PID of a call originator, a service number indicating the answer phone facilities, a service number indicating cancellation, so as to cancel the answer phone facilities (S121).

In step 121 of the third embodiment, the registered process execution means 12 auto-dials the personal number server 41, so that the personal number server 41 sets the answer facilities for the PHS terminal. When the PHS terminal is provided with the answer phone setting facilities, the execution service "setting of the answer phone facilities" corresponding to the newly detected reported location information is read out from the storage means 17, so that the automatic setting of the answer phone facilities is executed within the PHS terminal.

The registered process execution means 12 examines the storage means 17 to determine whether there are other execution services corresponding to the designated variation from "area A" to "area B" of the user-defined area names (S122).

The storage means 17 stores another execution service corresponding to the designated variation from "area A" to "area B". More specifically, the storage means 17 stores the corresponding execution service "setting of a call destination terminal" (S112, NO). Therefore, the registered process execution means 12 reads out the execution service "setting of a call destination terminal" from the storage means 17. The registered process execution means 12 sequentially auto-dials a personal number service number, a PID of a call originator, a service number indicating setting of a call destination terminal, and a service number indicating a domestic telephone set, so as to set the domestic telephone set as a call destination terminal (S121).

The registered process execution means 12 examines the storage means 17 to determine whether there are other execution services corresponding to the designated variation from "area A" to "area B" (S122). Since there are no other corresponding execution services (S122, YES), the registered process execution means 12 sets the flag to OFF (S123) and waits for the detection of reported location information from a base station by the reported location information detecting means 1.

An execution service may be set not to be executed automatically even if the information position detecting means 1 detects the designated variation of the reported location information corresponding to the user-defined area vector. In this case, execution of the execution service may be started after giving a notice of confirmation (sound or display) with the user of the PHS terminal.

Referring back to FIG. 6, the description given above, namely, the description regarding automatic execution of an execution service corresponding to a user-defined area vector name "home" performed when the reported location information detecting means 1 of the PHS terminal detects the designated variation of the user-defined area names corresponding to the user-defined area vector name "home", also applies to the portable telephone set. The mobile communication terminal of the third embodiment includes all of the constructions and facilities of the mobile communication terminal of the first and second embodiments.

The present invention is not limited to the above described embodiments, and variations and modifications may be made without departing from the scope of the present invention.

What is claimed is:

1. A mobile communication terminal comprising:

reported location information detecting means for detecting reported location information from a base station;

reported location information managing means for managing one of the reported location information specified by a user and a variation of the reported location information specified by the user;

registered process executing means for executing, when it is determined that the reported location information detected by said reported location information detecting means matches the reported location information managed by said reported location information managing means, a predetermined process that corresponds to the reported location information producing the match;

current reported location information storage means for storing current reported location information;

user-defined area name registering means for defining an arbitrary user-defined area name with respect to the current reported location information stored in said current reported location information storage means, by operating said mobile communication terminal; and execution service registering means for registering a process to be executed when the reported location information that corresponds to the user-defined area name is received, by operating said execution service registering means; and wherein said reported location information managing means comprises:

storage means for storing the reported location information, the user-defined area name and the execution service, in relation to each other;

wherein said execution service registering means comprises selecting means for selecting one of a triggered execution mode and an area-only mode for each execution service executed to set a condition for a communication service and executed upon receipt of the reported location information that corresponds to the user-defined area name defined with respect thereto, the triggered execution mode being a mode wherein the selection by the selecting means is triggered by the reception of the reported location information that corresponds to the user-defined area name defined with respect thereto, and is maintained even after said mobile communication terminal leaves an area that corresponds to the user defined area name, and the area-only mode being a mode wherein a previous setting for executing a previous executed execution service is stored in said storage means, and the execution service corresponding to the user-defined area name is selected, the previous setting being restored when said mobile communication terminal leaves the area that corresponds to the user-defined area name.

2. The mobile communication terminal as claimed in claim 1, further comprising combining means for executing a Boolean operation on a plurality of sets of reported location information.

3. The mobile communication terminal as claimed in claim 2, wherein said user-defined area name registering means comprises single-network user-defined area name registering means for defining an arbitrary user-defined area name with respect to a result of the Boolean operation performed by said combining means on the reported location information received from a plurality of base stations in a single mobile communication network.

4. The mobile communication terminal as claimed in claim 2, wherein said user-defined area name registering means comprises multiple-network user-defined area name registering means for defining an arbitrary user-defined area name with respect to a result of the Boolean operation performed by said combining means on the reported location information from base stations of a plurality of mobile common carrier.

5. A mobile communication terminal comprising:

reported location information detecting means for detecting reported location information from a base station;

reported location information managing means for managing one of the reported location information specified by a user and a variation of the reported location information specified by the user;

registered process executing means for executing, when it is determined that the reported location information detected by said reported location information detecting means matches the reported location information managed by said reported location information managing means, a predetermined process that corresponds to the reported location information producing the match;

current reported location information storage means for storing current reported location information;

previous reported location information storage means for storing previous reported location information immediately preceding the current reported location information;

user-defined area vector detecting means for referring to said current reported location information storage means and said previous reported location information storage means, so as to detect a designated variation of the reported location information that corresponds to a user-defined area vector name, wherein said reported location information managing means comprises:

user-defined area vector name registering means for defining an arbitrary user-defined area vector name with respect to the designated variation of the reported location information, by operating said mobile communication terminal;

execution service registering means for registering a process to be executed when the designed variation of the reported location information that corresponds to the user-defined area vector name is received, by operating said execution service registering means; and storage means for storing the reported location information, the user-defined area vector name and the execution service, in relation to each other.

6. The mobile communication terminal as claimed in claim 5, wherein said user-defined area vector name registering means comprises predictive defining means for defining the user-defined area vector name with respect to a combination of the current reported location information stored in said current reported location information storage means and subsequently-detected reported location information different from the current reported location information.

7. The mobile communication terminal as claimed in claim 6, further comprising timer means for measuring a time elapsed from a detection of the reported location information constituting the designated variation of the reported location information that corresponds to the user-defined area vector name, to a detection of the reported location information also constituting the designated variation, and for notifying said user-defined area vector name detecting means that a time-out has occurred when a count of the timer means exceeds a predetermined period of time preset by a user of said mobile communication terminal.

8. The mobile communication terminal as claimed in claim 5, wherein said user-defined area vector name registering means comprises retentive defining means for defining the user-defined area name with respect to a combination of the current reported location information stored in said current reported location information storage means and the previous reported location information stored in said previous reported location information storage means.

9. A mobile communication terminal comprising:

reported location information detecting means for detecting reported location information from a base station;

reported location information managing means for managing one of the reported location information specified by a user and a variation of the reported location information specified by the user;

registered process executing means for executing, when it is determined that the reported location information detected by said reported location information detecting means matches the reported location information managed by said reported location information managing means, a predetermined process that corresponds to the reported location information producing the match;

current reported location information storage means for storing current reported location information;

previous reported location information storage means for storing previous reported location information immediately preceding the current reported location information;

user-defined area vector detecting means for referring to said current reported location information storage means and said previous reported location information storage means, so as to detect a designated variation of the reported location information that corresponds to a user-defined area vector name, wherein said reported location information managing means comprises:

user-defined area name registering means for defining an arbitrary user-defined area name with respect to the reported location information stored in said current reported location information storage means, by operating said mobile communication terminal;

user-defined area vector name registering means for arbitrarily defining the user-defined area vector name with respect to the designated variation of the reported location information, by operating said mobile communication terminal;

execution service registered means for registering a process to be executed when the reported location information that corresponds to one of the user-defined area name and the user-defined area vector name is received, by operating said execution service registering means; and storage means for storing the reported location information, the user-defined area name and the execution service, in relation to each other and for storing the reported location information, the user-defined area vector name and the execution service, in relation to each other.

10. The mobile communication service as claimed in claim 9, wherein said user-defined area vector name registering means vector registering means for defining an arbitrary user-defined area vector name with respect to a designated variation of the user-defined area names defined by said user-defined area registering means, by operating said mobile communication terminal.

11. The mobile communication terminal as claimed in claim 9, wherein said user-defined area vector name registering means comprises predictive defining means for defining the user-defined area vector name with respect to a combination of the current reported location information stored in said current reported location information storage means and subsequently-detected reported location information different from the current reported location information.

12. The mobile communication terminal as claimed in claim 11, further comprising timer means for measuring a time elapsed from a detection of the reported location information constituting the designated variation of the reported location information that corresponds to the user-defined area vector name, to a detection of the reported location information also constituting the designated variation, and for notifying said user-defined area vector name detecting means that a time-out has occurred when a count of the timer means exceeds a predetermined period of time preset by a user of said mobile communication terminal.

13. The mobile communication terminal as claimed in claim 9, wherein said user-defined area vector name registering means comprises retentive defining means for defining the user-defined area name with respect to a combination of the current reported location information stored in said current reported location information storage means and the previous reported location information stored in said previous reported location information storage means.

14. The mobile communication terminal as claimed in claim 9, further comprising combining means for executing a Boolean operation on a plurality of sets of reported location information.

15. The mobile communication terminal as claimed in claim 14, wherein said user-defined area name registering means comprises single-network user-defined area name registering means for defining an arbitrary user-defined area name with respect to a result of the Boolean operation performed by said combining means on the reported location information received from a plurality of base stations in a single mobile communication network.

16. The mobile communication terminal as claimed in claim 14, wherein said user-defined area name registering means comprises multiple-network user-defined area name registering means for defining an arbitrary user-defined area name with respect to a result of the Boolean operation performed by said combining means on the reported location information from base stations of a plurality of mobile common carrier.

17. The mobile communication terminal as claimed in claim 9, wherein said execution service registering means comprises selecting means for selecting one of a triggered execution mode and an area-only mode for each execution service executed to set a condition (parameter) for a communication service and executed upon receipt of the reported location information that corresponds to the user-defined area name defined with respect thereto, the triggered execution mode being a mode wherein the selection by the selecting means is triggered by the reception of the reported location information that corresponds to the user-defined area name defined with respect thereto, and is maintained even after said mobile communication terminal leaves an area that corresponds to the user-defined area name, and the area-only mode being a mode wherein a previous setting for executing a previous executed execution service is stored in said storage means, and the execution service corresponding to the user-defined area name is selected, the previous setting being restored when said mobile communication terminal leaves the area that corresponds to the user-defined area name.

* * * * *